United States Patent
Nagata et al.

(10) Patent No.: US 7,472,243 B2
(45) Date of Patent: Dec. 30, 2008

(54) STORAGE SYSTEM AND CONTROL METHOD THEREOF

(75) Inventors: Koji Nagata, Tokyo (JP); Shoji Kodama, Tokyo (JP); Ikuya Yagisawa, Tokyo (JP); Katsuo Mogi, Tokyo (JP)

(73) Assignee: Hitachi, Ltd., Tokyo (JP)

(*) Notice: Subject to any disclaimer, the term of this patent is extended or adjusted under 35 U.S.C. 154(b) by 258 days.

(21) Appl. No.: 11/449,668

(22) Filed: Jun. 9, 2006

(65) Prior Publication Data

US 2007/0186067 A1    Aug. 9, 2007

(30) Foreign Application Priority Data

Feb. 9, 2006    (JP) ............................. 2006-032927

(51) Int. Cl.
*G06F 12/00*    (2006.01)
(52) U.S. Cl. .................................................. 711/162
(58) Field of Classification Search .................. 711/162
See application file for complete search history.

(56) References Cited

U.S. PATENT DOCUMENTS

| | | | |
|---|---|---|---|
| 5,790,773 A | 8/1998 | DeKoning et al. | |
| 5,835,953 A | 11/1998 | Ohran | |
| 6,038,639 A | 3/2000 | O'Brien et al. | |
| 6,253,295 B1 | 6/2001 | Beal et al. | |
| 6,434,186 B2 | 8/2002 | Dowling | |
| 6,434,681 B1 | 8/2002 | Armangau | |
| 6,643,671 B2 | 11/2003 | Mililo et al. | |
| 6,694,413 B1 | 2/2004 | Mimatsu et al. | |
| 6,748,504 B2 | 6/2004 | Sawdon et al. | |
| 6,771,843 B1 | 8/2004 | Huber et al. | |
| 6,981,114 B1 | 12/2005 | Wu et al. | |
| 7,363,446 B2 * | 4/2008 | Higaki et al. ............... | 711/162 |
| 2003/0065901 A1 | 4/2003 | Krishnamurthy | |
| 2003/0101321 A1 | 5/2003 | Ohran | |
| 2003/0131193 A1 | 7/2003 | Kodama et al. | |
| 2003/0131278 A1 | 7/2003 | Fujibayashi | |

(Continued)

FOREIGN PATENT DOCUMENTS

EP    1 424 632 A2    2/2003

(Continued)

OTHER PUBLICATIONS

European Search Report mailed May 21, 2007.

*Primary Examiner*—Brian R Peugh
(74) *Attorney, Agent, or Firm*—Reed Smith LLP; Stanley P. Fisher, Esq.; Juan Carlos A. Marquez, Esq.

(57) ABSTRACT

Upon receiving a primary/secondary switching command from a secondary host system, a secondary storage control device interrogates a primary storage control device as to whether or not yet to be transferred data that has not been remote copied from the primary storage control device to the secondary storage control device is present. In the event that yet to be transferred data is present, the secondary storage control device receives yet to be transferred data from the primary storage control device and updates a secondary volume. The primary storage control device then manages positions of updates to the primary volume due to host accesses to the primary volume occurring at the time of the secondary storage control device receiving the primary/secondary switching command onwards using a differential bitmap table.

18 Claims, 15 Drawing Sheets

U.S. PATENT DOCUMENTS

| | | |
|---|---|---|
| 2003/0221077 A1 | 11/2003 | Ohno et al. |
| 2003/0229656 A1 | 12/2003 | Hitz et al. |
| 2004/0177226 A1 | 9/2004 | Chen |
| 2004/0199733 A1 | 10/2004 | Watanabe et al. |
| 2005/0210193 A1 | 9/2005 | Nagata |
| 2005/0210209 A1* | 9/2005 | Nagata ....................... 711/162 |
| 2005/0210210 A1 | 9/2005 | Arai et al. |
| 2005/0289309 A1* | 12/2005 | Suzuki ....................... 711/162 |
| 2006/0069889 A1* | 3/2006 | Nagaya et al. .............. 711/162 |

FOREIGN PATENT DOCUMENTS

JP  2005-293469  4/2005

* cited by examiner

- INTERNAL COPY EXECUTION PROGRAM — 200
- REMOTE COPY EXECUTION PROGRAM — 210
- CONTROL PROGRAM — 220
- VOLUME MANAGEMENT TABLE — 230

36

230

VOLUME MANAGEMENT TABLE

| VOL-ID | PATH INFORMATION | VOL INFORMATION | POOL VOL FLAG | PAIR INFORMATION |
|---|---|---|---|---|
| 1 | ... | PRIMARY VOL | 0 | .... |
| 2 | — | — | 1 | .... |
| 3 | — | — | 1 | .... |
| 4 | — | — | 1 | .... |
| ⋮ | ⋮ | ⋮ | ⋮ | ⋮ |

FIG. 5

| TIME | ACTION | PRIMARY VOL | VIRTUAL VOL | SNAPSHOT MANAGEMENT INFORMATION | SECONDARY VOL | VIRTUAL VOL |
|---|---|---|---|---|---|---|
| TIME t0 | TIME OF SPLITTING OF PRIMARY VOL AND VIRTUAL VOL | IMAGE T0 [A] | IMAGE T0 (SIZE = 0) | INFORMATION FOR RESTORING IMAGE T0 | — | — |
| TIME t1 | REMOTE COPY EXECUTION | IMAGE T1 [B] | IMAGE T0 [A] | INFORMATION FOR RESTORING IMAGE T0 | — | — |
| TIME t2 | REMOTE COPY EXECUTION | IMAGE T2 [B][C] | IMAGE T0 [A] | INFORMATION FOR RESTORING IMAGE T0 | IMAGE T0 [A] | — |
| TIME t3 | TIME OF SPLITTING OF PRIMARY VOL AND VIRTUAL VOL | IMAGE T3 [B][D] | IMAGE T3 (SIZE = 0) | INFORMATION FOR RESTORING IMAGE T3 | IMAGE T0 [A] | — |
| TIME t4 | REMOTE COPY EXECUTION | IMAGE T4 [B][E] | IMAGE T4 [D] | INFORMATION FOR RESTORING IMAGE T3 | IMAGE T0 [A] | — |
| TIME t5 | REMOTE COPY EXECUTION | IMAGE T5 [F][E] | IMAGE T5 [B][D] | INFORMATION FOR RESTORING IMAGE T3 | IMAGE T3 [B][D] | IMAGE T3 [A] |
| TIME t6 | TIME OF SPLITTING OF PRIMARY VOL AND VIRTUAL VOL | IMAGE T6 [G][E] | IMAGE T6 (SIZE = 0) | INFORMATION FOR RESTORING IMAGE T6 | IMAGE T3 [B][D] | IMAGE T3 [A] |
| .... | .... | .... | .... | .... | .... | .... |

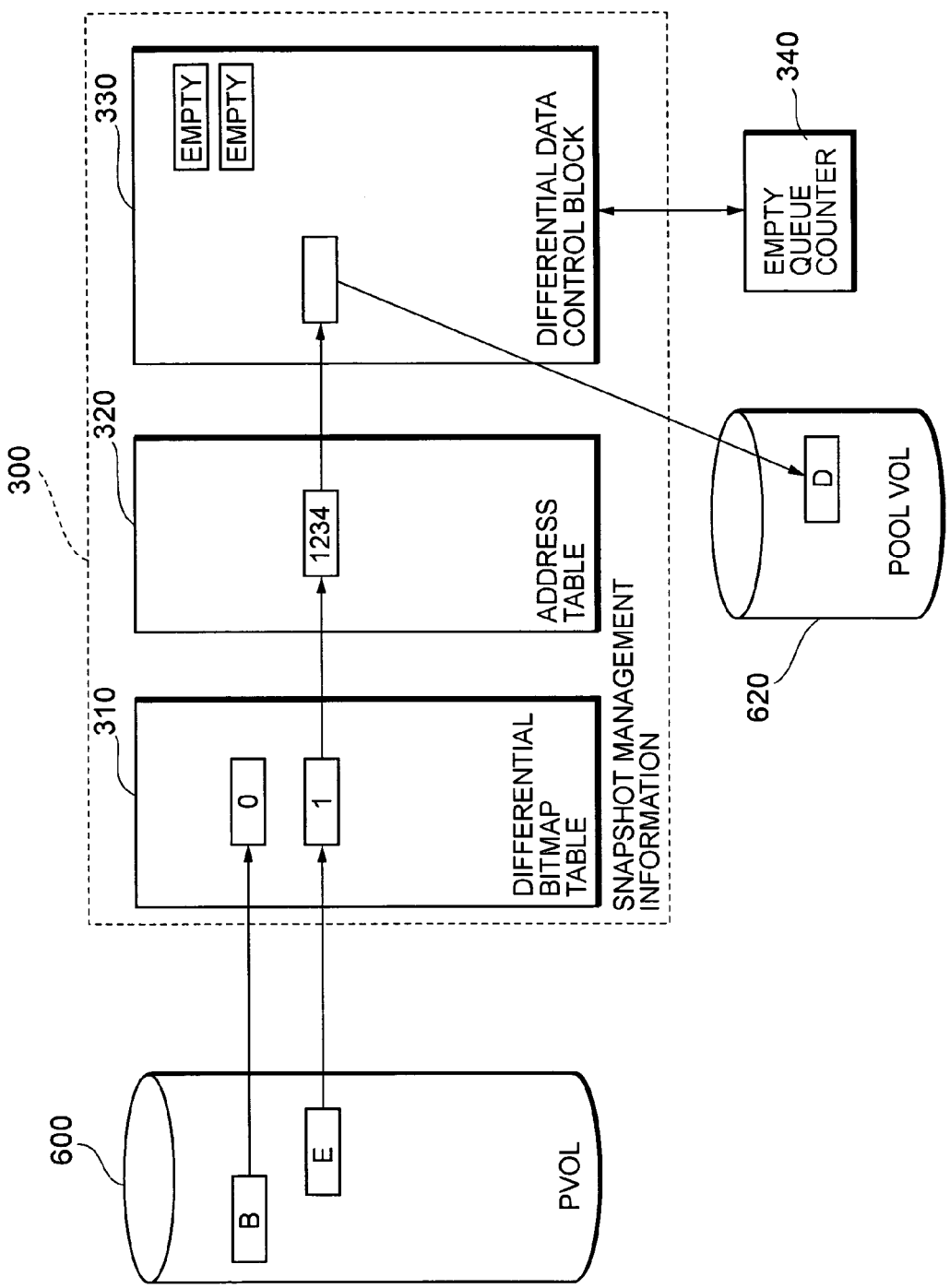

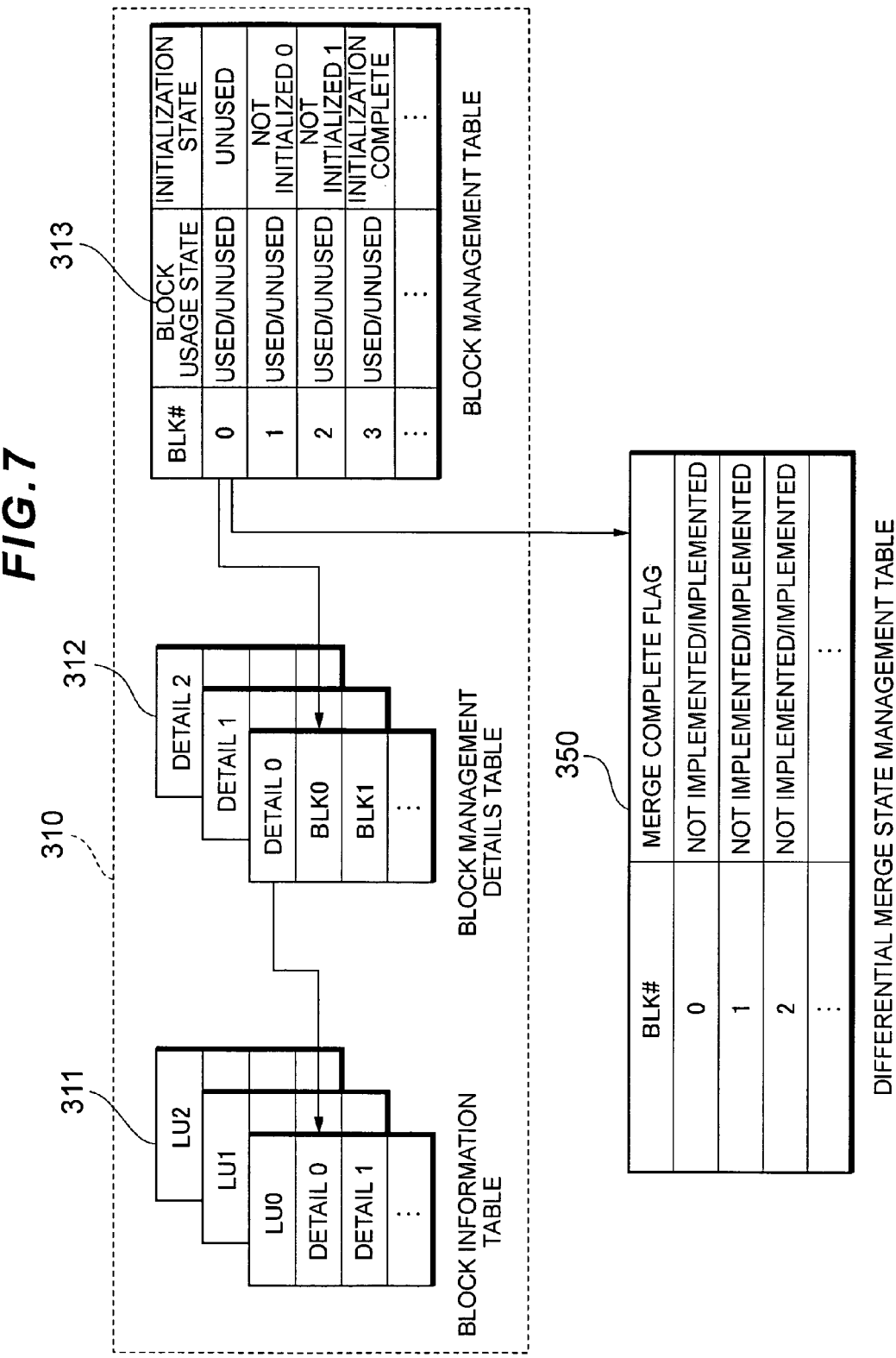

POOL GROUP — PVOL
CORRESPONDENCE TABLE         900

| POOL GROUP # | ASSIGNED LU | PVOL# |
|---|---|---|
| 1 | 1,2,3 | 1 |
| 2 | 4,5,6 | 2,3 |
| ⋮ | ⋮ | ⋮ |

FIG.12A
|    |    |    |    |    |
|----|----|----|----|----|
| 10 | 5  | 3  | 11 | 4  |
| 30 | 1  |    |    | 21 |
| 22 | 23 | 9  | 8  |    |
|    | 20 | 19 |    |    |
320
FIG.12B
|    |    |    |    |    |
|----|----|----|----|----|
|    |    |    | 11 | 4  |
| 30 | 1  |    |    | 21 |
| 22 | 23 | 9  | 8  |    |
|    | 20 | 19 |    |    |
320
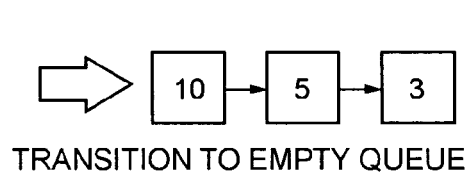
TRANSITION TO EMPTY QUEUE
FIG.12C
|    |    |    |    |    |
|----|----|----|----|----|
|    |    |    |    |    |
| 30 | 1  |    |    | 21 |
| 22 | 23 | 9  | 8  |    |
|    | 20 | 19 |    |    |
320
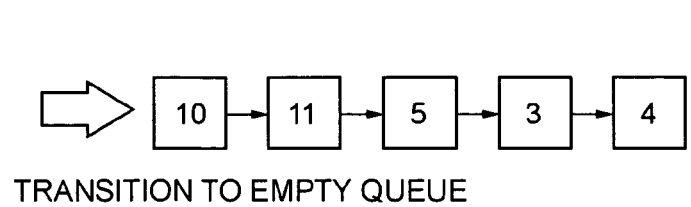
TRANSITION TO EMPTY QUEUE

STORAGE SYSTEM AND CONTROL METHOD THEREOF

CROSS-REFERENCES TO RELATED APPLICATIONS

This application relates to and claims priority from Japanese Patent Application No. 2006-32927, filed on Feb. 9, 2006, the entire disclosure of which is incorporated herein by reference.

BACKGROUND

The present invention relates to a storage system and a control method thereof.

In a database system handling vast scales of data such as a data center, data is managed using a storage system configured separately from a host system. For example, a disc array system is well-known as this kind of storage system. In a disc array system, a large number of disc drives arranged in an array are managed as a RAID (Redundant Array of Independent Inexpensive Disks). At least one physical unit is then formed on the physical storage region provided by the large number of disc drives and this logical unit is provided to the host system. The host system then recognizes the logical unit as a single physical device and accesses data on the logical unit.

This type of storage system is taken as a measure for reliably preserving data should accidents etc. occur. For example, a system with a high fault tolerance is disclosed in Japanese Patent Laid-open Publication No. 2005-293469 where data written to a primary storage control device is remote copied to a secondary storage control device so that the data is duplicated.

SUMMARY

However, if a fault occurs in a host system making data input/output requests to the primary storage control device or if faults occur at both the primary storage control device and the host system, it is necessary to switch over the primary and second storage control devices to continue operation. In the event of transferring data from a primary storage control device to a secondary storage control device using an asynchronous remote copy, at the time of switching between the primary and the secondary devices, it is assumed that there may be cases where un-transferred data that has not yet been transferred from the primary storage control device to the secondary storage control device may exist. It is therefore necessary to subject un-transferred data to appropriate processing in order to make the data at the secondary storage control device as recent as possible. Further, when a fault occurs in the host system, it is assumed that there may also be cases where a write access is requested to the primary storage control device in the middle of a primary/secondary switching process and it is therefore necessary to process this kind of write access in an appropriate manner.

The present invention therefore tackles the problem of carrying out a process of switching between primary and secondary storage control devices at the time of a system fault. The further objects of the present invention will become apparent from an embodiment disclosed in the following.

In order to resolve the problem described above, the storage system of the present invention comprises a primary storage control device having a first logical volume and a secondary storage control device having a second logical volume capable of forming a copy pair with the first logical volume.

The primary storage control device is comprised of a first differential bitmap table for managing positions of updates to the first logical volume due to host accesses, first snapshot management information for logically reconfiguring a data image of the first logical volume, a first pool region for storing data prior to updating constituted by data prior to updating as a result of a host access that is data written to the first logical volume, a first writing section for writing the data prior to updating to the first pool region when the first logical volume is updated at a predetermined timing onwards, a first snapshot updating section for updating the first snapshot management information with information for logically reconfiguring a data image for the first logical volume occurring at the time of the predetermined time when the first logical volume is updated at the predetermined timing onwards, a first transfer differential bitmap table for managing whether or not update data of the first logical volume has been remote copied to the second logical volume, a transfer bitmap table update section for updating the first transfer differential bitmap table by merging bit information of the first differential bitmap table with the first transfer differential bitmap table and a remote copy section for discerning whether each data constituting a data image for the first logical volume at the point in time of the predetermined timing is in the first logical volume or the first pool region based on the updated first transfer differential bitmap table, and acquiring data from the discerned party and transmitting the data to the second logical volume.

The secondary storage control device is comprised of a second transfer differential bitmap table for managing positions of updates to the second logical volume due to remote copying, second snapshot management information for logically reconfiguring a data image of the second logical volume, a second pool region for storing data prior to updating constituted by data prior to updating as a result of remote copying that is data written to the second logical volume, a second writing section for writing the data prior to updating to the first pool region when the second logical volume is updated as a result of remote copying, and a second snapshot updating section for updating the second snapshot management information with information for logically reconfiguring a data image for the second logical volume occurring at the time of the predetermined time when the second logical volume is updated.

Upon receiving a primary/secondary switching command from a host system, the secondary storage control device interrogates a primary storage control device as to whether or not yet to be transferred data that has not been remote copied from the primary storage control device to the secondary storage control device is present. In the event that not yet transferred data is present, the not yet transferred data is received from the primary storage control device and the second logical volume is updated.

The primary storage control device then manages positions of updates to the first logical volume due to host accesses to the first logical volume occurring at the time of the secondary storage control device receiving the primary/secondary switching command onwards using the first differential bitmap table.

In the event that there is no response from the primary storage control device to the interrogation for yet to be transferred data, the secondary storage control device restores a data image for the second logical volume at a certain time in the past based on the second snapshot management information.

According to the present invention, it is possible to carry out a primary/secondary switching process for a storage control device at the time of system failure in an appropriate manner.

DESCRIPTION OF THE DRAWINGS

FIG. 5 is a view illustrating an asynchronous remote copy processing sequence.

FIG. 6 is a view illustrating an outline of a snapshot update process.

FIG. 7 is a detailed configuration view of a differential bitmap table.

FIG. 12A-12C are views illustrating an outline of differential data control block queue management.

DETAILED DESCRIPTION

The following is a description with reference to each of the drawings of an embodiment of the present invention.

Figure 1:
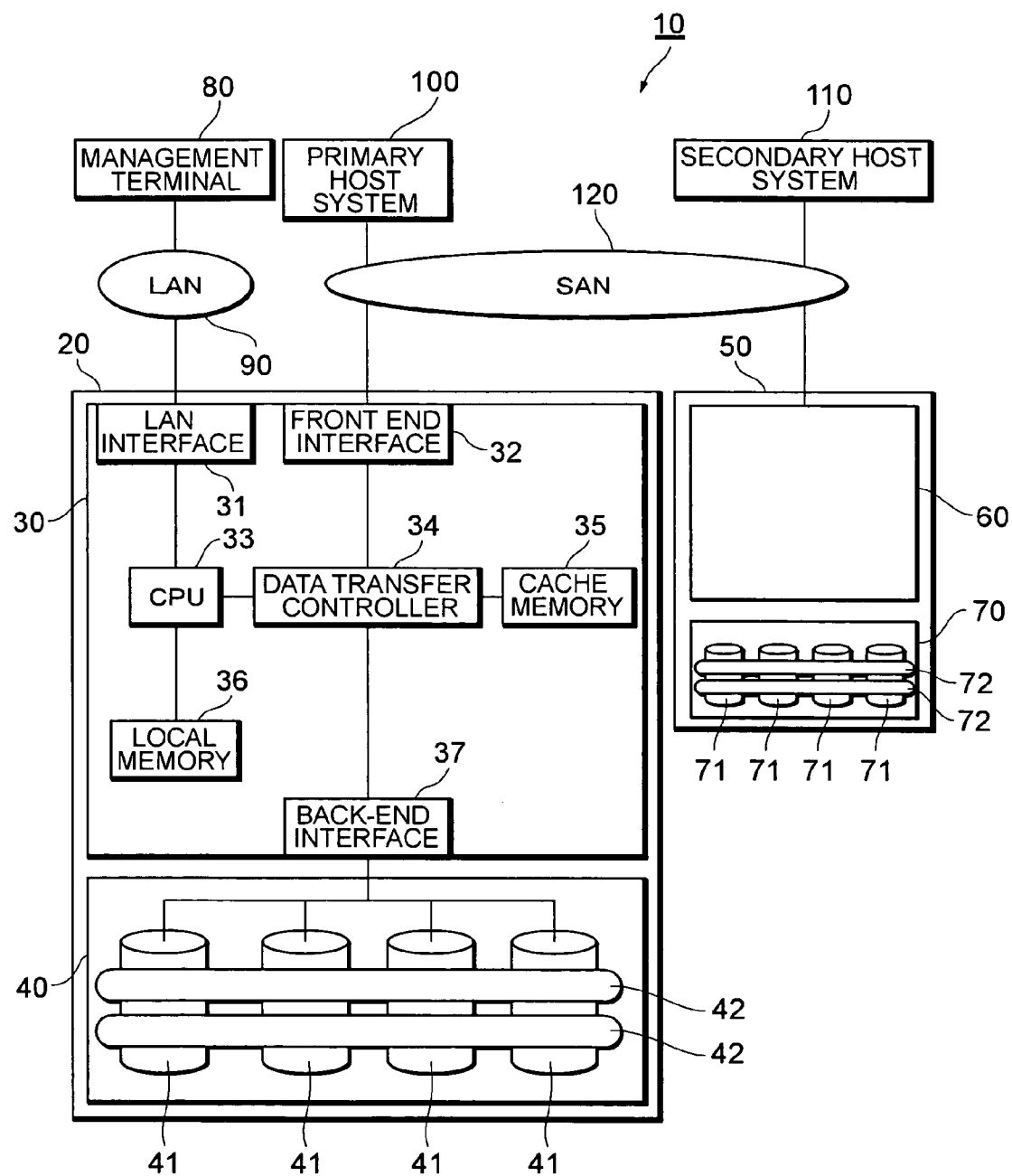
FIG. 1 is a system configuration view of a storage system of an embodiment.

FIG. 1 shows a system configuration of a storage system 10 of an embodiment. The storage system 10 is comprised of a primary storage control device 20 installed at a local site, and a secondary storage control device 50 installed at a remote site. The primary storage control device 20, the secondary storage control device 50, a primary host system 100, and a secondary host system 110 are mutually connected via an SAN (Storage Area Network) 120.

The primary host system 100 is an everyday host system that mainly makes requests for I/O processes to the primary storage control device 20 during normal operation. The secondary host system 110 is a standby host system that mainly makes a request for an I/O process to the secondary storage control device 50 when a fault occurs in the system so as to take over processes carried out by the primary host system 100 at the time of a fault. The primary host system 100 and the secondary host system 110 are, for example, personal computers, workstations, or mainframe computers, etc.

The storage system 10 is configured so that data written to the primary storage control device 20 is remote copied to the secondary storage control device 50. The secondary storage control device 50 holds the same data images as data images held in the past by the primary storage control device 20. In this way, it is possible for the system to be made to operate using the secondary storage control device 50 even when a fault occurs at the primary storage control device 20. As a remote copy method taking as a condition the writing of data to both the primary storage control device 20 and the secondary storage control device 50, copying may take place at the same time as notification of write completion to the primary host system 100, or copying may take place asynchronously, with notification of write completion to the primary host system 100 taking place at the stage of data being written to the primary storage control device 20, with this data then being transferred to the secondary storage control device 50 at an appropriate time. In the following description, an example is given where the primary storage control device 20 operates as a primary storage control device for an operation system and the secondary storage control device 50 operates as a secondary storage control device for a standby system.

The primary storage control device 20 is primarily comprised of a controller 30 and a storage device 40.

The controller 30 is comprised of a LAN (Local Area Network) interface 31, a front end interface 32, a CPU 33, a data transfer controller 34, cache memory 35, local memory 36, and a back-end interface 37.

The controller 30 is capable of controlling the plurality of disc drives 41 using RAID levels (for example, 0, 1, 5) defined in the so-called RAID system. The RAID system manages a plurality of disc drives 41 as a single RAID group. A plurality of logical volumes 42 are then defined in access units by the primary host system 100 on the RAID group. A LUN (Logical Unit Number) is assigned to the respective logical volumes 42.

The CPU 33 is a processor for controlling I/O processes (write accesses, read accesses) to the plurality of disc drives 41 in response to data input/output requests from the primary host system 100.

Various microprograms and volume management tables etc. are stored in the local memory 36. The details of the various microprograms and volume management tables are described in the following.

The cache memory 35 is a buffer memory for temporarily storing write data to be written to a disc drive 41 and read data read from a disc drive 41. The cache memory 35 has a power supply back-up and is configured from non-volatile memory so that even if a power supply fault occurs at the primary storage control device 20 cached data is not lost.

The data transfer controller 34 is connected to the cache memory 35, the front end interface 32, back-end interface 37, and the CPU 33 and controls transfer of data between the primary host system 100 and the disc drive 41. When there is a write access request from the primary host system 100, the data transfer controller 34 writes data received from the primary host system. 100 via the front end interface 32 to cache memory 35, and then transfers this write data to the back-end interface 37 with the purpose of asynchronously writing this write data to the disc drive 41. Further, when a read access is requested by the primary host system 100, read data read from the disc drive 41 via the back-end interface 37 is written to the cache memory 35 and this read data is transferred to the front end interface 32.

The front end interface 32 is a controller for controlling interfacing with the primary host system 100 and has a function for receiving block access requests from the primary host system 100 based on, for example, fiber channel protocol.

The back-end interface 37 is a controller for controlling interfacing with the disc drive 41 and has a function for controlling data input/output requests to the disc drive 41 based on, for example, a protocol for controlling the disc drive 41.

The LAN interface 31 is an interface for connecting with the LAN 90, and controls transmission and receipt of data and control signals with a management terminal 80 based on TCP/IP.

The storage device 40 is equipped with a plurality of disc drives 41. The disc drive 41 is a storage device such as an F C (Fibre Channel) disc drive, a S A T A (Serial Advanced Technology Attachment) disc drive, a P A T A (Parallel Advanced Technology Attachment) disc drive, a F A T A (Fibre Attached Technology Adapted) disc drive, an S A S (Serial Attached SCSI) disc drive, or an S C S I (Small Computer System Interface) disc drive, etc.

The primary storage control device 20 is connected to the management terminal 80 via a LAN (Local Area Network) 90. The management terminal 80 is, for example, a computer system comprised of hardware resources such as a CPU, memory, and display etc. A system administrator then sends commands for managing the primary storage control device 20 to the primary storage control device 20 using input operations of the management terminal 80. For example, a command instructing extension, reduction, or changing of the RAID configuration of the disc drives 41, a command for setting a communication path between the primary host system 100 and the primary storage control device 20, a command for installing microprograms of the CPU 33 into the memory 26, or a command for specifying verification of the operating state of the primary storage control device 20 or malfunctioning regions exist as commands for managing the primary storage control device 20.

The secondary storage control device 50 is primarily comprised of a controller 60 and a storage device 70.

The detailed configuration of the controller 60 is the same as the detailed configuration of the controller 30 described above. The storage device 70 is equipped with a plurality of disc drives 71. The controller 60 is capable of controlling the plurality of disc drives 71 using RAID levels (for example, 0, 1, 5) defined in the so-called RAID system. The RAID system manages a plurality of disc drives 71 as a single RAID group. A plurality of logical volumes 72 are then defined in access units by the secondary host system 110 on the RAID group. A LUN (Logical Unit Number) is assigned to the respective logical volumes 72.

Figures 2, 3:
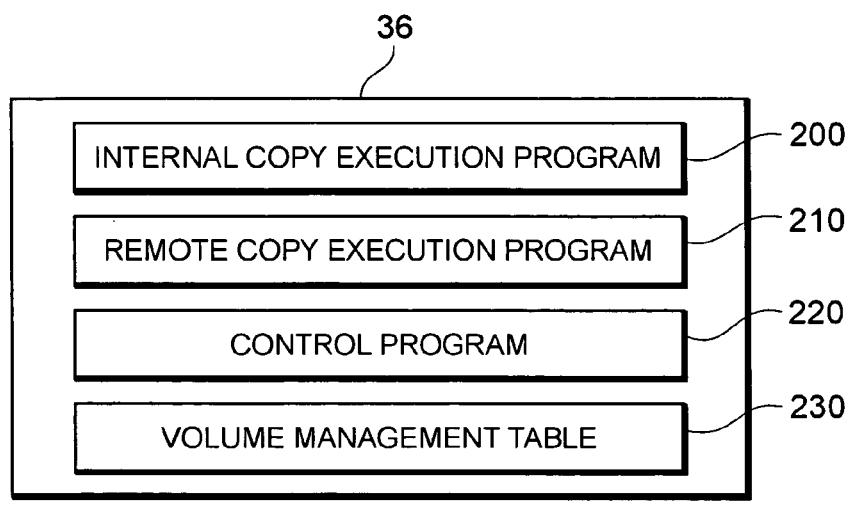
FIG. 2 is a view illustrating each type of microprogram and volume management table.
FIG. 3 is a view illustrating a volume management table.

FIG. 2 shows each type of microprogram and volume management table.

The local memory 36 stores an internal copy execution program 200, a remote copy execution program 210, a control program 220, and a volume management table 230. The internal copy execution program 200 executes an internal copy process and a snapshot update process. The remote copy execution program 210 executes remote copying. The control program 220 controls the internal copy execution program 200 and the remote copy execution program 210. The volume management table 230 stores information relating to the plurality of logical volumes 42.

FIG. 3 shows a table configuration for the volume management table 230.

A VOL-ID for identifying a logical volume (hereinafter abbreviated to "VOL"), path information indicating an access path to this logical volume, the type of this logical volume (hereinafter referred to as "VOL type"), a flag indicating whether or not this logical volume is a pool volume (hereinafter referred to as "pool VOL" flag) and information relating to VOL pairs included in this logical volume (hereinafter referred to as "pair information") are stored for each of the plurality of logical volumes 42 in a correlated manner at the volume management table 230. At least one of the information elements (for example, VOL-ID, VOL type, pool VOL flag) of the information stored in the volume management table 230 can be inputted from the management terminal 80 or primary host system 100, etc.

VOL type may be, for example, "primary", "secondary", or "pool". A VOL type of "primary" (hereinafter referred to as "primary VOL" or "PVOL") is a VOL that is a copy source in a copy process (for example, a remote copy process). A VOL type of "secondary" (hereinafter referred to as "secondary VOL" or "SVOL") is a VOL that is a copy destination in a copy process (for example, a remote copy process). A secondary VOL has a storage capacity of at least greater than the capacity of the primary VOL. Path information is defined at the primary VOL and the secondary VOL. However, a VOL type of "pool" (hereinafter referred to as "pool VOL") is path information that is as yet undefined. The details of the pool VOL are described in the following.

The pool VOL flag indicates whether or not a corresponding logical volume is a pool VOL. Specifically, for example, if the pool VOL flag is "1" a logical volume corresponding to this is a pool VOL, and if a pool VOL flag is "0", a logical volume corresponding to this is not a pool VOL.

For example, pair opponent information and pair state are included in the pair information. For example, an ID of a storage control device having pair opponent VOL, VOL-ID of the pair opponent VOL, and path information etc. exist as information relating to a logical volume (hereinafter referred to as "pair opponent VOL") constituting a pair opponent, in the pair opponent information. For example, "SMPL", "COPY", "PAIR", "PSUS", "SPLIT", "SSWS" etc. exist as pair states.

"SMPL" shows a state where there is no primary/secondary relationship prior to pair generation.

"COPY" shows a state of forming a copy of copying data for a primary VOL to a secondary VOL. Writing to the secondary VOL is prohibited in "COPY".

"PAIR" shows a state of asynchronous copying from a primary VOL to a secondary VOL. Writing to the secondary VOL is prohibited in "PAIR".

"PSUS" shows a state where asynchronous copying from a primary VOL to a secondary VOL is suspended. Reading from and writing to the secondary VOL is prohibited in "PSUS".

"SPLIT" shows a state where a primary VOL and a secondary VOL are logically split, with only differential data for before and after updating of the primary VOL being copied to the secondary VOL.

"SSWS" shows a state where the secondary VOL is capable of reading/writing. In "SSWS", data of the secondary VOL is reconfigured to content defined for the previous time, and the primary VOL is put into "PSUS".

The CPU 33 is capable of specifying the type of logical volume 42 to be accessed and the pair information by referring to the volume management table 230. Further, in the event that a pool VOL is assigned to being divided into virtual volumes as described later, the CPU 33 defines information showing a path to this pool VOL, and the defined path information is registered in the volume management table 230. Further, the CPU 33 is also capable of putting pool VOLs into a not-yet used state by deleting path information for pool VOLs that are no longer assigned. The CPU 33 is capable of determining whether each pool VOL is in use or in a not-yet used state from whether or not path information is registered.

Figure 4:
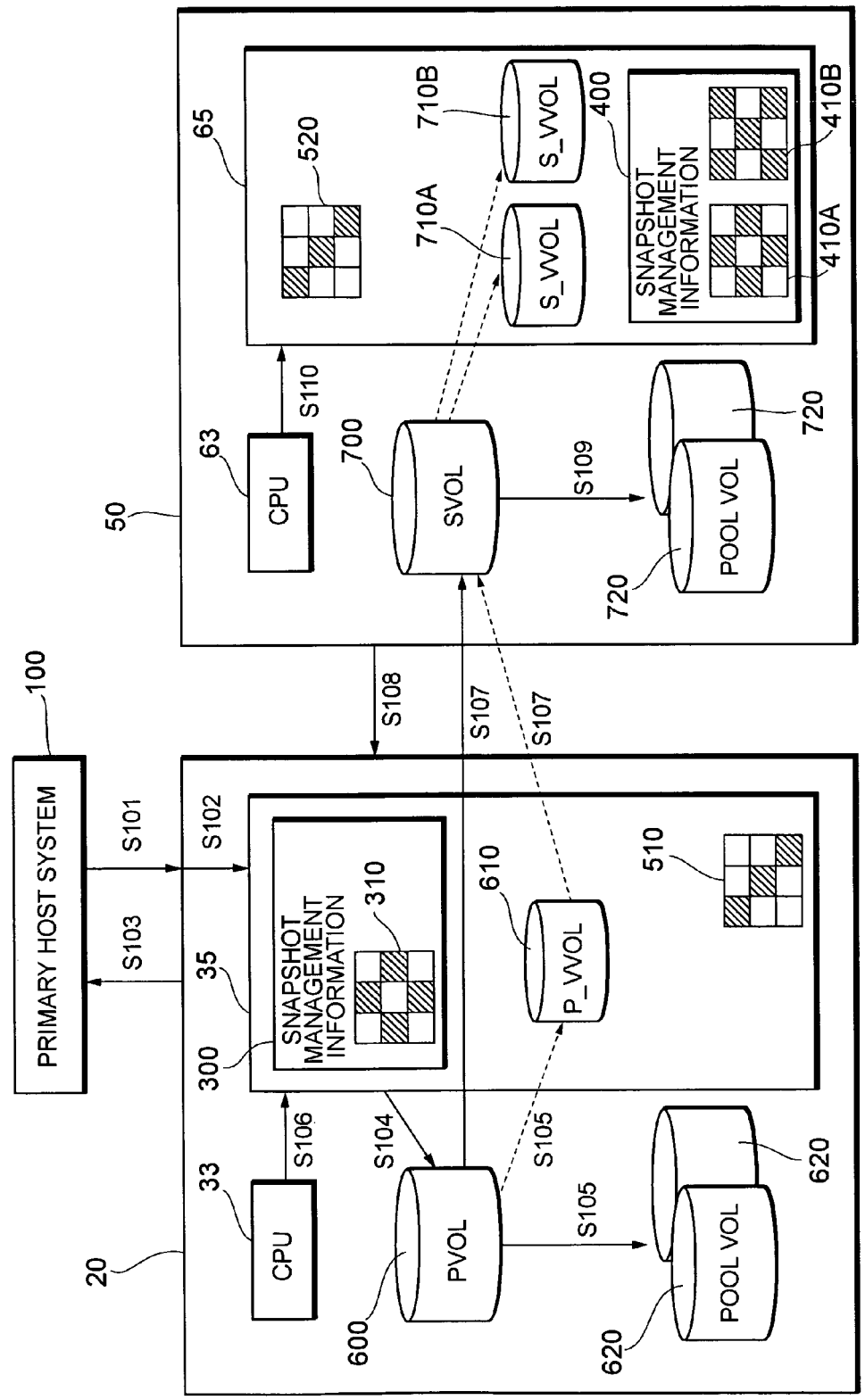
FIG. 4 is a view illustrating an outline of an asynchronous remote copy process.

FIG. 4 shows an outline of an asynchronous remote copy process executed by the primary storage control device 20.

The primary storage control device 20 is comprised of the CPU 33, the cache memory 35, a primary VOL 600, a virtual VOL 610, a plurality of pool VOLs 620, snapshot management information 300, and a transfer differential bitmap table 510.

The pool VOL 620 is a logical volume for saving differential data before and after updating when a data image for the primary VOL 600 is updated at a time where the pair state for the primary VOL 600 and the virtual VOL 610 is split or later.

The virtual VOL 610 is a virtual logical volume for reconfiguring a data image of the primary VOL 600 at a certain point in time from data stored in the primary VOL 600 at a certain time and data saved in a pool VOL 620 from the primary VOL 600 at a certain time or later. The virtual VOL 610 is capable of logically holding snapshots of the primary VOL 600. In this specification, the process of reconfiguring a data image for the primary VOL 600 at a certain time in the past in a logical manner to the virtual VOL 610 (i.e. the process of making a snapshot) is referred to as an "internal copy". The virtual VOL 610 is capable of forming a pair from the primary VOL 600 and a secondary VOL 700. In this embodiment, an example is shown for the case where the virtual VOL 610 is formed in the storage region of the cache memory 35 but this may also be formed in a storage region of the disc drive 41. For ease of description, there are cases where the virtual VOL 610 is abbreviated to P_VVOL.

At the virtual VOL 610, the CPU 33 is capable of selecting one or more pool VOLs 620 (for example, not-yet-used pool VOLs that do not correlate to any VOL) from the plurality of pool VOLs 620 and assigning the selected one or more pool VOLs 620 to the virtual VOL 610. The CPU 33 is also capable of appropriately increasing or decreasing the number of pool VOLs 620 assigned to the virtual VOL 610 according to the state of consumption of the storage resources.

The snapshot management information 300 is information for reconfiguring a data image for the primary VOL 600 at a certain time using a snapshot. The CPU 33 is capable of reconfiguring a data image for the primary VOL 600 occurring at a certain point in time to the virtual VOL 610 by determining whether each data constituting a data image for the primary VOL 600 occurring at a certain time exists on a pool VOL 620 or the primary VOL 600 by referring to the snapshot management information 300, and acquiring data from the discerned party. The snapshot management information 300 includes a differential bitmap table 310 indicating the position of updated data of the primary VOL 600.

The transfer differential bitmap table 510 shows the position of differential data to be remote copied to the secondary VOL 700 when data of the primary VOL 600 is updated after synchronization of the primary VOL 600 and the secondary VOL 700.

The CPU 33 is also capable of making a pair state between the primary VOL 600 and the virtual VOL 610 a copy state. When a pair state between the primary VOL 600 and the virtual VOL 610 has become a copy state, when data is written to the primary VOL 600, the CPU 33 writes this data to the virtual VOL 610 and a pool VOL 620.

The CPU 33 is also capable of making a pair state between the primary VOL 600 and the virtual VOL 610 a split state. When the pair state between the primary VOL 600 and the virtual VOL.610 has become a split state, when data is written to the primary VOL 600, the CPU 33 causes the internal copy program 200 to run, and the internal copy process and internal copy process and snapshot update process are executed.

The secondary storage control device 50 is comprised of a CPU 63, cache memory 65, the secondary VOL 700, a plurality of virtual VOLs 710A, 710B, a plurality of pool VOLs 720, snapshot management information 400, and a transfer differential bitmap table 520.

The pool VOL 720 is a logical volume for saving differential data before and after updating when a data image for the secondary VOL 700 is updated at a time where the pair state for the secondary VOL 700 and the virtual VOL 710A or the virtual VOL 710B is split or later.

The virtual VOLs 710A, 710B are virtual logical volumes for reconfiguring a data image of the secondary VOL 700 at a certain point in time from data stored in the secondary VOL 700 at a certain time and data saved in the pool VOL 720 from the secondary VOL 700 at a certain time or later. The virtual VOLs 710A, 710B are capable of logically holding snapshots of the secondary VOL 700. In this embodiment, an example is shown for the case where the virtual VOLs 710A, 710B are formed in the storage region of the cache memory 65 but this may also be formed in a storage region of the disc drives 71. For ease of description, there are cases where the virtual VOLs 710A, 710B are abbreviated to S_VVOL.

The snapshot management information 400 is information for reconfiguring a data image for the secondary VOL 700 at a certain time using a snapshot. The CPU 63 is capable of reconfiguring a data image for the secondary VOL 700 occurring at a certain point in time to the virtual VOLs 710A and 710B by determining whether each data constituting a data image for the secondary VOL 700 occurring at a certain time exists on a pool VOL 720 or the secondary VOL 700 by referring to the snapshot management information 400, and acquiring data from the discerned party. The snapshot management information 400 includes differential bitmap tables 410A and 410B indicating the position of updated data of the secondary VOL 700.

The transfer differential bitmap table 520 shows the position of data of the secondary VOL 700 updated as a result of remote copying when data of the primary VOL 600 is updated after synchronization of the primary VOL 600 and the secondary VOL 700.

Next, additional description is given of the details of the internal copy process, the snapshot update process, and the remote copy process. In the following description, it is assumed that a pair state between the primary VOL 600 and the virtual VOL 610 is a split state.

When a write access request is received from the primary host system 100 (S101), the primary storage control device 20 stores the write data in the cache memory 35 (S102) and notifies the primary host system 100 of write completion (S103).

The CPU 33 then reads the write data written to the cache memory 35 and writes this data to the primary VOL 600 (S104). At this time, the CPU 33 moves the data prior to updating (data prior to updating (overwriting) with the write data, that is past data written to the primary VOL 600) from the primary VOL 600 to the pool VOL 620 (S105).

When the pair state between the primary VOL 600 and the virtual VOL 610 is a split state, when an internal copy is executed, each data constituting a data image of the primary VOL 600 at a certain point in time is distributed between the primary VOL 600 and the pool VOL 620.

Next, the CPU 33 updates the snapshot management information 300 with information for reconfiguring the data image of the primary VOL 600 at this split time from data stored in the primary VOL 600 at the time (hereinafter referred to as "split time") where the snapshot management information is split between the primary VOL 600 and the virtual VOL 610 and data moved from the primary VOL 600 to the pool VOL 620 at this split time or later (S106). The virtual VOL 610 is therefore capable of logically holding snapshots of the primary VOL 600 as a result of this snapshot update processing.

When a pair state between the primary VOL 600 and the virtual VOL 610 is a split state, the CPU 33 repeatedly executes the process of S102 to S106 described above each time a write access request is received from the primary host system 100.

The CPU 33 causes the remote copy execution program 210 to operate after a predetermined time has elapsed from the split time and executes a remote copy process. The remote copy execution program 210 merges the differential bitmap table 310 with the transfer differential bitmap table 510. The remote copy execution program 210 then determines whether each data for reconfiguring the data image of the primary VOL 600 occurring at the time of splitting exists on the primary VOL 600 or on the pool volume 620 based on the transfer differential bitmap table 510, acquires date from the determined party, and transfers this data to the secondary storage control device 50 (S107). The data image for the primary VOL 600 at the time of splitting is then reconfigured to the secondary VOL 700 as a result of this remote copy process.

When data is received from the primary storage control device 20, the secondary storage control device 50 notifies the primary storage control device 20 of write completion (S108).

Thereafter, while data received from the primary storage control device 20 is written to the secondary VOL 700, the CPU 63 moves the data prior to updating (data prior to being updated (overwritten) with the write data, that is past data written to the secondary VOL 700) from the secondary VOL 700 to the pool VOL 720 (S109).

Further, the CPU 63 updates information for reconfiguring the data image for the secondary VOL 700 occurring at the time of splitting from data stored in the secondary VOL 700 at the time of splitting and data moved from the secondary VOL 700 to the pool VOL 720 after the time of splitting with snapshot management information 400 (S100).

The CPU 63 is used to alternately switch virtual VOL 710A and 710B. As a result, for example, the CPU 63 logically takes a snapshot of the secondary VOL 700 at the virtual VOL 710A and is capable of clearing the differential bitmap table 410B. A long period of time is required to clear the differential bitmap tables 410A and 410B. When a snapshot is made by alternately switching the virtual VOLs 710A and 710B, it is possible to clear the differential bitmap tables 410A and 410B using parallel processing, which gives superior efficiency.

The CPU 33 functions as a section (for example, a write section for writing data prior to updating of the primary VOL 600 to the pool VOL 620, a snapshot updating section for updating the snapshot management information 300, a transfer differential bitmap table updating section for updating the transfer differential bitmap table 510, and a remote copy section for remote copying un-transferred data from the primary storage control device 20 to the secondary storage control device 50, etc.) for controlling the primary storage control device 20.

The CPU 63 functions as a section (for example, a writing section for writing data prior to updating of the secondary VOL 700 to the pool VOL 720, and snapshot updating section for updating the snapshot management information 400, etc.) for controlling the secondary storage control device 50.

FIG. 5 shows an asynchronous remote copy process sequence executed by the primary storage control device 20.

Time t0 shows the splitting time where a pair state between the primary VOL 600 and the virtual VOL 610 is split. The data image of the primary VOL 600 occurring at this time t9 is referred to as "image T0". The image T0 is taken to be a data image storing data block A in a first block region of the primary VOL 600. Data prior to updating is not stored in the pool VOL 620 at the time of this time t0. The snapshot management information 300 is information for reconfiguring the image T0.

At a time t1 (i.e. during the duration of the split state), when data block B is overwritten at the first block region of the primary VOL 600, the data image of the primary VOL 600 is changed from the image T0 to the image T1. At this time, the internal copy execution program 200 writes data block A (data prior to updating) from the primary VOL 600 to the virtual VOL 620, and updates the snapshot management information 300 with information indicating that the first block region of the primary VOL 600 is updated and that the data block A (data prior to updating) existing in the first block region is stored in the virtual VOL 620.

Further, at time t1, the remote copy execution program 210 instructs the control program 220 to execute a remote copy process. The remote copy execution program 210 the specifies that the data block A constituting the image T0 exists in the virtual VOL 610 by referring to the transfer differential bitmap table 510, acquires the data block A from the virtual VOL 610, and transmits the data block A to the secondary storage control device 50.

The time t2 is the time where the remote copy process is complete. As a result, the image T0 formed at the primary VOL 600 at the time t0 is duplicated at the secondary VOL 700.

Further, at a time t2 (i.e. during the duration of the split state), when data block C is written to the second block region of the primary VOL 600, the data image of the primary VOL 600 is changed from the image T1 to the image T2. At this time, the internal copy execution program 200 updates information indicating that the second block region of the primary VOL 600 has been updated with the snapshot management information 300.

For example, when the data block D is written to the second block region of the primary VOL 600 after the time t2 and before the time t3, the data image for the primary VOL 600 is changed from the image T2 to the image T3 (a data image where data block B is present in the first block region and data block D is present in the second block region). At this time, the internal copy execution program 200 moves the data block C (data prior to updating) from the primary VOL 600 to the pool VOL 620, the snapshot management information 300 is updated to information indicating that the second block region of the primary VOL 600 has been updated and that the data block C that was present in this second block region is stored in the pool VOL 620.

After this, the primary VOL 600 and the virtual VOL 610 are put into a split state again at the time t3 before updating of the primary VOL 600 is carried out.

At the point in time of the time t3, in other words, in the event of a split state, the CPU 33 erases all of the data for before updating stored in the pool VOL 620 for the purpose of logically holding an image T3 for the primary VOL 600 at the time t3 in the virtual VOL 610.

Further, the CPU 33 updates the snapshot management information 300 from information for reconfiguring the image T0 to information for reconfiguring the image T3. Specifically, for example, at the time t3, the primary VOL 600 is in a state of not yet having been updated. The CPU 33 therefore updates the snapshot management information 300 with information indicating that the primary VOL 600 has not yet been updated.

When a data block E is written to the second block region of the primary VOL 600 at the point in time of time t4, the data image for the primary VOL 600 is changed from the image T3 to the image T4. At this time, the internal copy execution program 200 writes the data block D (data prior to updating) from the primary VOL 600 to the virtual VOL 610, the snapshot management information 300 is updated to information indicating that the second block region of the primary VOL 600 has been updated, and that the data block D that was present in this second block region has been moved to the pool VOL 620.

The remote copy process can be carried out at the point in time of the time t4. By referring to the transfer differential bitmap table 510, as there is no update to the first block region of the primary VOL 600, the remote copy execution program 210 understands that the data block B constituting the image T3 is in the primary VOL 600, and as there is no update to the second block region of the primary VOL 600, the remote copy execution program 210 understands that the other data block D constituting the image T3 is in the pool VOL 620. The remote copy execution program 210 acquires data block B from the primary VOL 600, acquires data block D from the pool VOL 620, and transfers data block B and data block D to the secondary storage control device 50.

The point of time at the time t5 is the time where the remote copy process completes. As a result, the image T0 occurring at the secondary VOL 700 is updated to the image T3 of the primary VOL 600 occurring at time t3. Namely, the data block B is written to the data block A of the first block region of the secondary VOL 700 and the data block D is written to the second block region of the secondary VOL 700.

From thereafter, the secondary storage control device 50 holds the image T3 for the period up to where data constituting an image T6 for the next split time t6 is received.

Thereafter, the process described above executed in time t3 to time t5 is repeated.

Namely, at the primary storage control device 20, the primary VOL 600 and the virtual VOL 610 are put into split states either in a periodic or non-periodic manner. During the duration of this split state, the remote copy process is executed until the next split state (in other words, the internal copy process and the snapshot update process are in parallel). From the time where the remote copy process is complete onwards, again, the primary VOL 600 and the virtual VOL 610 are put into a split state and the data prior to updating is deleted from the pool VOL 620. By repeating this kind of process, a data image (image T0 occurring at time t0, image T3 occurring at time t3, or image T6 occurring at time t6 in the example of FIG. 5) of a primary VOL 600 occurring at periodic or non-periodic times of splitting can be logically held in the virtual VOL 610 so that this data image can be copied to the secondary VOL 700.

FIG. 6 shows an outline of snapshot update processing of this embodiment, and more specifically, shows a situation where a data image for the primary VOL 600 is changed from image T3 to image T4, and image T3 is logically held by the virtual VOL 610.

The snapshot management information 300 is comprised of the differential bitmap table 310, address table 320, and differential data control block 330.

The differential bitmap table 310 has a plurality of bits respectively corresponding to a plurality of block regions (where, for example, one block region is 64 Kbytes) within the primary VOL 600. For example, in the event of changing from image T3 to image T4, as shown in FIG. 6, the first block region of the primary VOL 600 is not updated. The bit corresponding to this first block region therefore remains at "0" and the data block D is overwritten at the second block D of the second block region. The bit corresponding to the second block region is therefore updated from bit "0" to bit "1".

The address table 320 has address regions respectively corresponding to the plurality of block regions of the primary VOL 600. If data prior to updating corresponding to a certain block region exists, an address on the differential data control block 330 that is an address corresponding to this address region is stored at the address region corresponding to this certain block region.

The differential data control block 330, for example, has management regions respectively corresponding to the plurality of block regions within the pool VOL 620. Which generation snapshot data the data prior to updating stored at positions corresponding to the block regions within the pool VOL 620 the snapshot data is recorded in each management region. The respective differential data control blocks 330 are connected to other differential data control blocks 300 by pointers. In this specification, the queue structure of the differential data control blocks 330 is referred to as a "DDCB queue". For convenience, there are also cases where the differential data control block 330 is referred to as "DDCB". The CPU 33 is capable of acquiring data prior to updating for a plurality of generations.

Regions of the differential data control block 330 that are not used are managed as empty queues. An empty queue is managed by an empty queue counter 340.

With the above configuration, a data image for the primary VOL 600 occurring at the time of taking a snapshot can be duplicated to the virtual VOL 610. Which generation data within the virtual VOL 610 that is data prior to updating is for is managed by the differential data control block 330.

FIG. 7 shows a detailed configuration for the differential bitmap table 310.

The differential bitmap table 310 is comprised of a block information table 311, a block management details table 312, and a block management table 313.

The block management table 313 manages "BLK usage state" and "initialization state" for each block region (hereinafter this may also be referred to as "BLK") within the primary VOL 600. "Used" and "unused" exist as BLK usage states. "Used" shows that a block region is being used by a copy system. "Unused" shows that a block region is not being used by a copy system. "Unused", "not initialized 0", "not initialized 1" and "initialization complete" exist as "initialization states". "Unused" shows that a block region is not secured. "Not initialized 0" shows that a block region is not initialized to "0". "Not initialized 1" shows that a block region is not initialized to "1". "Initialization complete" shows that a block region is initialized to "0" or "1".

The block management details table 312 is the block management table 313 relating to a plurality of block regions lumped together.

The block information table 311 is a plurality of block management details tables 312 lumped together, and manages block regions belonging to each LU (Logical Unit) within a primary VOL 600.

A differential merge state management table 350 manages the presence or absence of processing for merging from the differential bitmap table 310 to the transfer differential bitmap table 510. A merge complete flag indicates whether a merge process is "implemented" or "not implemented". The details of the merge process are described in the following.

FIG. 8A-8D show an outline of merge processing from the differential bitmap table 310 to the transfer differential bitmap table 510. "Black" of the bitmap tables 310 and 510 indicates that a bit is "1", i.e. indicated bit on, and "white" indicates that a bit is "0", i.e. bit off.

Figure 8A:
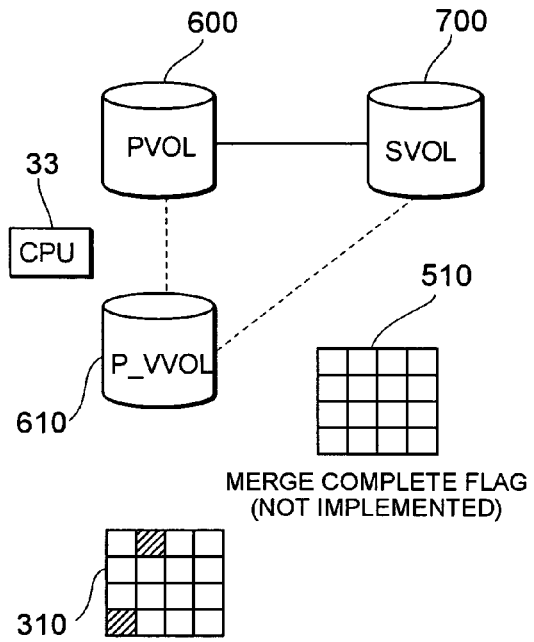
FIG. 8A-8D are views illustrating an outline of a merge process.

FIG. 8A shows that the primary VOL 600 and the secondary VOL 700 are in a pair state, and that the merge complete flag is "not implemented".

Figure 8B:
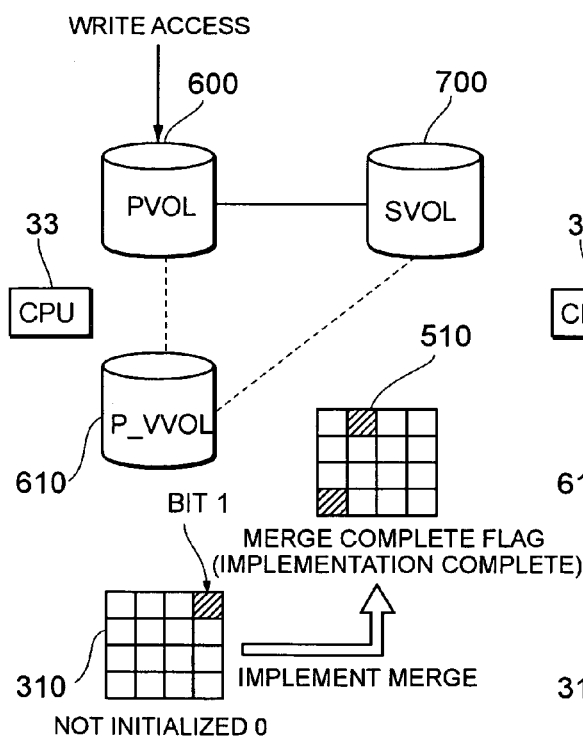

FIG. 8B shows a merge process occurring at the time of a write access to the primary VOL 600. When there is a write access to the primary VOL 600, the CPU 33 refers to the merge complete flag, and checks for the presence or absence of a merge process from the differential bitmap table 310 to the transfer differential bitmap table 510.

The CPU 33 then carries out a bit merge process because the merge complete flag is "not implemented", and the merge complete flag is updated to "implemented". Further, the CPU 33 then updates bits, of the bits of the differential bitmap table 310, that have been subjected to merge processing to "not initialized 0", and bits corresponding to a position where a write access to the primary VOL 600 has occurred are updated to "1".

Figure 8C:
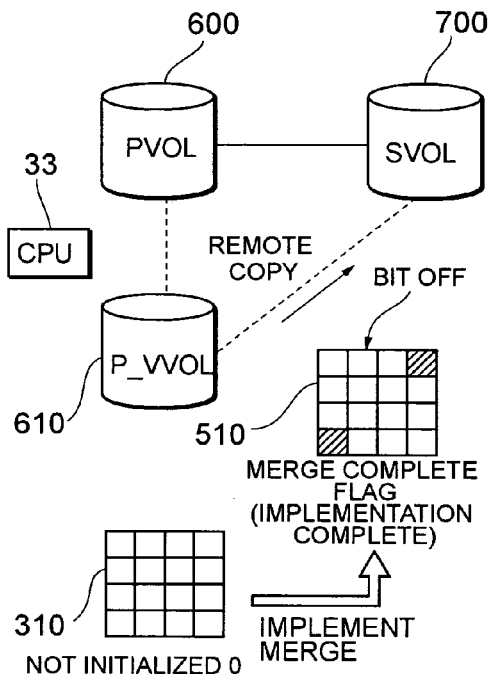

FIG. 8C shows a merge process occurring at the time of remote copying. The CPU 33 carries out merge processing from the differential bitmap table 310 to the transfer differential bitmap table 510 at the time of remote copy implementation and updates the merge complete flag to "implemented". Further, the CPU 33 then updates bits, of the bits of the differential bitmap table 310, that have been subjected to merge processing to "not initialized 0", and updates bits, of the bits of the transfer differential bitmap table 510, corresponding to the position of data remote copied to the secondary VOL 700 to "0".

Figure 8D:
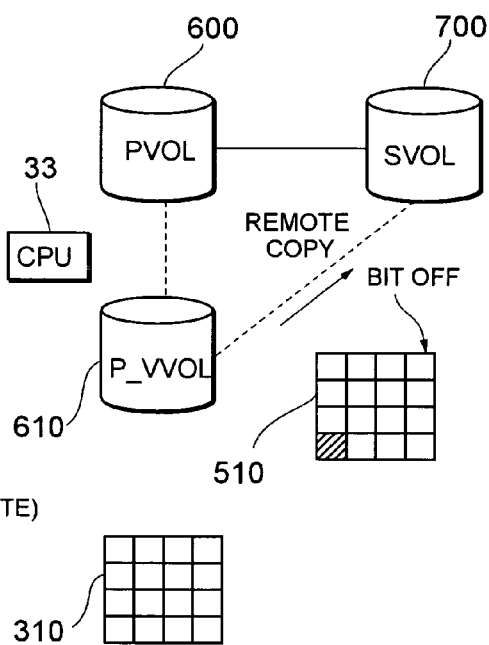

FIG. 8D shows a bit off process of the transfer differential bitmap table 510 occurring at the time of remote copying. Further, the CPU 33 then implements ongoing remote copying while referring to the transfer differential bitmap table 510, and updates bits, of the bits of the transfer differential bitmap table 510, corresponding to the position of data remote copied to the secondary VOL 700 to "0". A bit "1" will therefore not be present in the differential bitmap table 310 until there is a write access to the primary VOL 600.

It is assumed that the pool VOL 620 remote copies data prior to updating from the virtual VOL 610 to the secondary VOL 700 and that as the data prior to updating is temporarily saved, data prior to updating that it is necessary to save in the pool VOL 620 has a bit "1" of the bits of the differential bitmap table 310, that is data prior to updating of block regions corresponding to bits that have not yet been merged in the transfer differential bitmap table 510. Increase in the amount of data stored in the pool VOL 610 can be suppressed by limiting the data prior to updating stored in the pool VOL 610 to data that is required to be remote copied.

On the other hand, data prior to updating saved in the pool VOL 720 is used in data recovery for the secondary VOL 700. It is therefore necessary to save data prior to updating of the secondary VOL 700 in all of the pool VOLs 720.

Figure 9:
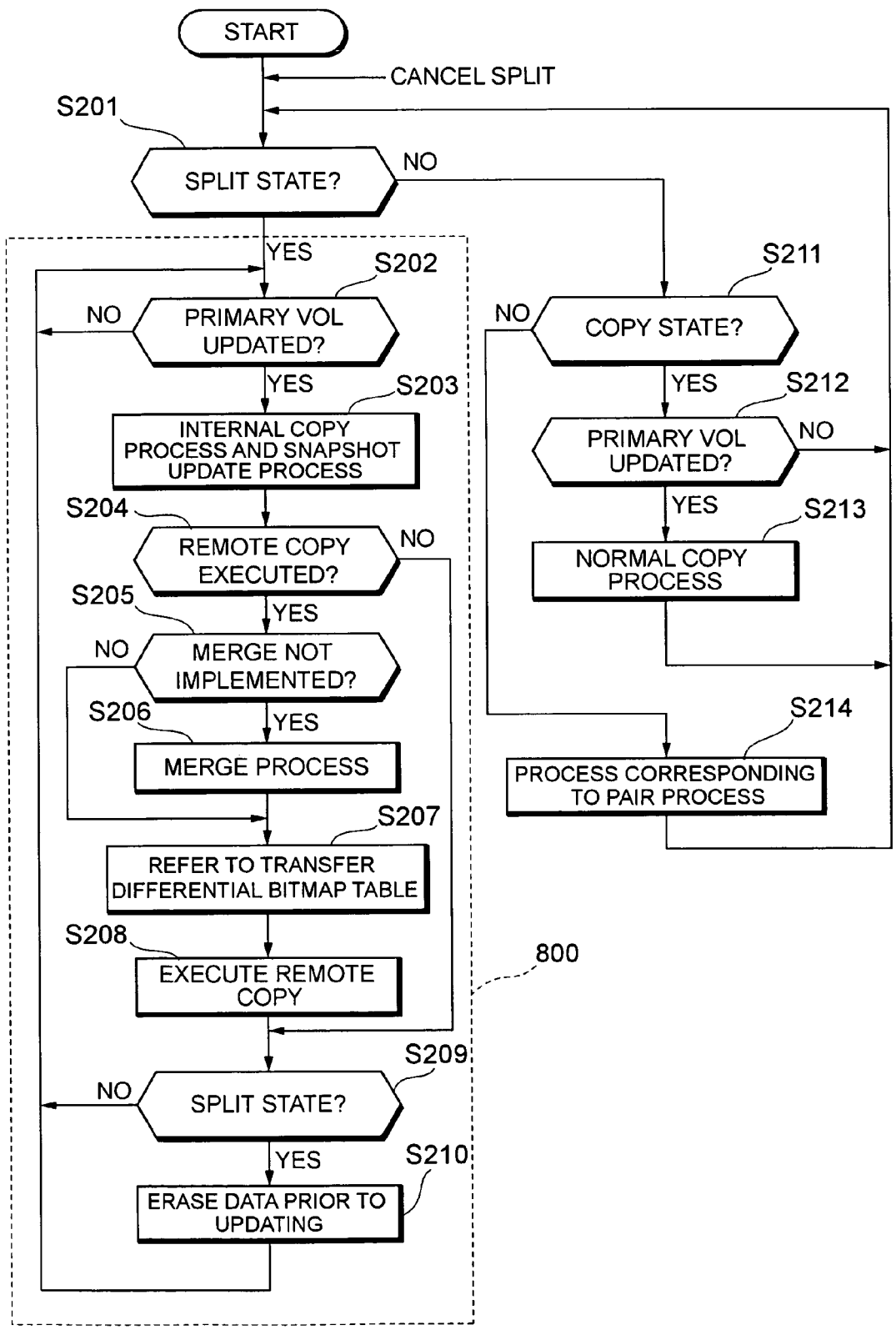
FIG. 9 is a view illustrating an asynchronous remote copy flowchart.

FIG. 9 is a flowchart showing an asynchronous remote copy process sequence executed by the primary storage control device 20.

The CPU 33 puts the pair state between the primary VOL 600 and the virtual VOL 610 to a split state, and updates the volume management table 230 (S201: YES).

When new data is written to the primary VOL 600 as a result of a write access to the primary VOL 600 (S202: YES), the CPU 33 executes the internal copy process and snapshot update process described above (S203).

When there is a write access to the primary VOL 600, the internal copy process and snapshot update process accompanying this write access are repeated at least until a remote copy is implemented during the duration of the split state (S204: NO).

When a remote copy process is executed during the duration of the split state (S204: YES), the CPU 33 refers to the margin complete flag, and checks whether or not a process of merging from the differential bitmap table 310 to the transfer differential bitmap table 510 is not yet implemented (S205).

In the event that the merge process is not yet implemented (S205: YES), the CPU 33 carries out merge processing from the differential bitmap table 310 to the transfer differential bitmap table 510 (S206), refers to the transfer differential bitmap table 510 (S207), and implements remote copying (S208).

In the event that implementation of the merge processing is complete (S205: NO), the CPU 33 refers to the transfer differential bitmap table 510 (S207), and implements remote copying (S208).

When the remote copy is complete and a transition is again made to a split state (S209: YES), the CPU 33 deletes all of the data prior to updating stored in the pool VOL 620, and also deletes updated information of the snapshot management information 300 (S210). As a result, the virtual VOL 610 and the snapshot management information 300 are updated in information for reconfiguring a data image for the primary VOL 600 occurring at the point in time of the split state re-starting.

Thereafter, the process of S202 to S210 is then repeated. Namely, the loop shown by the dotted frame 800 is formed. At this loop, in the event that, for example, a split state is cancelled, the CPU 33 executes S201 in a manner isolated from the loop. The process of FIG. 5 described above is an example of a process for the loop shown in the dotted frame 800.

On the other hand, if the split state has not started (S201: NO), if the pair state between the primary VOL 600 and the virtual VOL 610 is a copy state (S211: YES), when new data is written to the primary VOL 600 as a result of a write access to the primary VOL 600 (S212: YES), the normal copy process described above is executed (S213).

When the pair state of the primary VOL 600 and the virtual VOL 610 is not a split state (S201: NO), in the event that the state is not a copy state (S211: NO), processing according to the pair state at this time is carried out (S214).

In the above description, for ease of description, an example is shown where one PVOL 600 correlates to one pool VOL 620 but this is by no means limiting. A configuration where the primary storage control device 20 is equipped with a plurality of PVOLs and a plurality of pool groups, and data prior to updating from a particular PVOL is only stored in a certain pool group is also possible. Similarly, a configuration where the secondary storage control device 50 is equipped with a plurality of SVOLs and a plurality of pool groups, and data prior to updating from a particular SVOL is only stored in a certain pool group is also possible. A pool group is a storage region comprised of one or more LU's (Logical Units). A pool group may also be referred to as a pool region.

Figures 10, 11:
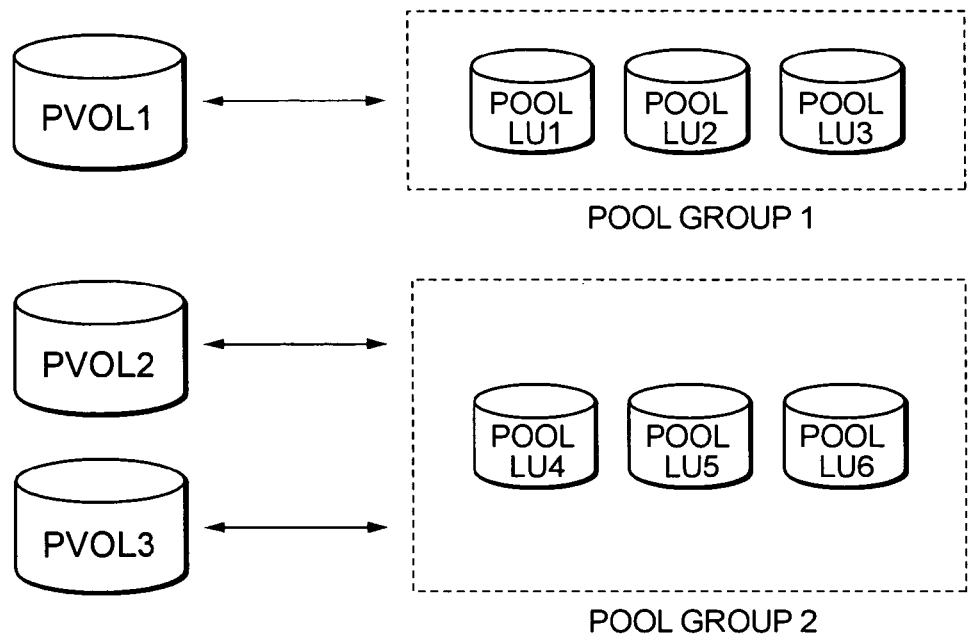
FIG. 10 is a view illustrating a correspondence relationship between PVOLs and pool groups.
FIG. 11 is a view illustrating a pool group—PVOL correspondence table.

FIG. 10 is a view illustrating a correspondence relationship between PVOLs and pool groups. As shown in the same drawing, the primary storage control device 20 is equipped with a plurality of PVOL1, PVOL2, PVOL3, and a plurality of pool groups 1 and 2. PVOL1 correlates to pool group 1, and data saved from PVOL1 is stored in the pool group 1. Pool group 1 is a storage region comprised of LU1, LU2 and LU3. PVOL2 and PVOL3 correlate to pool group 2, and data saved from PVOL2 and PVOL3 is stored in the pool group 2. Pool group 2 is a storage region comprised of LU4, LU5 and LU6.

FIG. 11 shows a pool group—PVOL correspondence table 900. The pool group—PVOL correspondence table 900 stores "pool group #", "assigned LU", and "PVOL#" in a respectively corresponding manner. "Pool group #" shows the number of the pool group. "Assigned LU" shows the number of the LU assigned to a pool group. "PVOL#" shows the number of a PVOL.

In this manner, by storing saved data from a certain PVOL just to a certain pool group, if there is a fault (for example, overflow etc.) at one of the pool groups, this will not influence the other pool groups.

Next, a description is given of the queue management process for the differential data control block 330. The number within the address table 320 shows the number (hereinafter described as the "DDCB number" or the "DDCB#") of the differential data control block 330. When data stored in the pool VOL 620 is erased, it is necessary to make the DDCB queue that managed this erased data an empty queue. The following algorithm can be applied in order to connect to the DDCB and form an empty queue.

(1) A check is made as to whether a DDCB having a DDCB# of D D C B #±1, D D C B #±2, . . . , or D D C B #±N for a "DDCB to be newly connected" exists in an empty queue.

(2) In the event that a plurality of DDCBs having a DDCB# of D D C B #+1, D D C B #+2, . . . , or D D C B #+N for a "DDCB to be newly connected" exist, a connection "DDCB to be newly connected" is made to directly before a DDCB having a DDCB# closest to the DDCB# of the "DDCB to be newly connected".

(3) In the event that only one DDCB having a DDCB# of D D C B #+1, D D C B #+2, . . . , or D D C B #+N for a "DDCB to be newly connected" exists, the "DDCB to be newly connected" is connected immediately before this DDCB.

(4) In the event that a plurality of DDCBs having a DDCB# of D D C B #-1, D D C B #-2, . . . , or D D C B #-N for a "DDCB to be newly connected" exist, a connection "DDCB to be newly connected" is made to directly after a DDCB having a DDCB# closest to the DDCB# of the "DDCB to be newly connected".

(5) In the event that only one DDCB having a DDCB# of D D C B #-1, D D C B #-2, . . . , or D D C B #-N for a DDCB to be newly connected exists, the "DDCB to be newly connected" is connected immediately after this DDCB.

(6) In the event that a DDCB having a DDCB# of D D C B #±1, D D C B #±2, . . . , or D D C B #±N for a "DDCB to be newly connected" does not exist, the "DDCB to be newly connected" is connected to the end of the empty queue.

FIG. 12A-12C and FIG. 13A-13C show an example of the algorithm described above taking N=1.

FIG. 12A shows an initial state. None of the DDCB queues have made a transition to the empty queue.

FIG. 12B shows the situation where DDCB queues for DDCB#10, DDCB#5 and DDCB#3 make a transition to the empty queue.

The DCCB of DDCB#4 or DDCB#6 is searched as a process preceding connection of the DCCB of DDCB#5 to the empty queue. As a DDCB for DDCB#10 only exists in the empty queue, the DDCB of DDCB#5 is connected to the tail end of the empty queue.

The DCCB of DDCB#2 or DDCB#4 is searched as a process preceding connection of the DCCB of DDCB#3 to the empty queue. As a DDCB#10 and DDCB#5 only exist in the empty queue, the DDCB of DDCB#3 is connected to the tail end of the empty queue.

FIG. 12C shows the situation where DDCB queues for DDCB#11 and DDCB#4 make a transition to the empty queue.

The DCCB of DDCB#10 or DDCB#12 is searched as a process preceding connection of the DCCB of DDCB#11 to the empty queue. The DDCB of DDCB#10 is present in the empty queue. The DDCB of the DDCB#11 is therefore inserted directly after the DDCB of DDBB#10 so as to form the empty queue.

The DCCB of DDCB#3 or DDCB#5 is searched as a process preceding connection of the DCCB of DDCB#4 to the empty queue. The DDCB of DDCB#3 is present in the empty queue. The DDCB of the DDCB#4 is therefore inserted directly after the DDCB of DDBB#3 so as to form the empty queue.

Figure 13A:
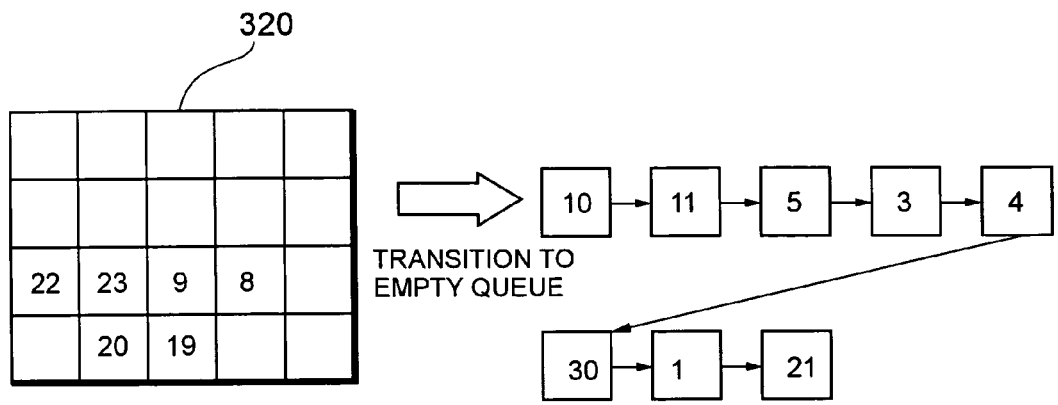
FIG. 13A-13C are views illustrating an outline of differential data control block queue management.

FIG. 13A shows the situation where DDCB queues for DDCB#30, DDCB#1 and DDCB#21 make a transition to the empty queue.

The DCCB of DDCB#29 or DDCB#31 is searched as a process preceding connection of the DCCB of DDCB#30 to the empty queue. As DDCB's for DDCB#10, DDCB#5, DDCB#3, DDCB#11 and DDCB#4 only exist in the empty queue, the DDCB of DDCB#30 is connected to the tail end of the empty queue.

The DCCB of DDCB#0 or DDCB#2 is searched as a process preceding connection of the DCCB of DDCB#1 to the empty queue. As DDCB's for DDCB#10, DDCB#5, DDCB#3, DDCB#11, DDCB#4 and DDCB#30 only exist in the empty queue, the DDCB of DDCB#1 is connected to the tail end of the empty queue.

The DCCB of DDCB#20 or DDCB#22 is searched as a process preceding connection of the DCCB of DDCB#21 to the empty queue. As DDCB's for DDCB#10, DDCB#5, DDCB#3, DDCB#11, DDCB#4, DDCB#30 and DDCB#1 only exist in the empty queue, the DDCB of DDCB#21 is connected to the tail end of the empty queue.

Figure 13B:
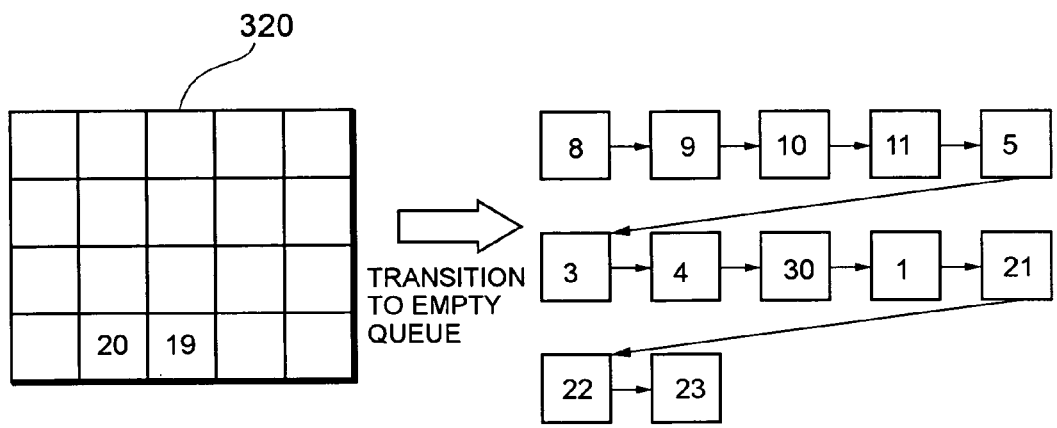

FIG. 13B shows the situation where DDCB queues for DDCB#22, DDCB#23, DDCB#9 and DDCB#8 make a transition to the empty queue.

The DCCB of DDCB#21 or DDCB#23 is searched as a process preceding connection of the DCCB of DDCB#22 to the empty queue. The DDCB of DDCB#21 is present in the empty queue. The DDCB of the DDCB#22 is therefore connected directly after the DDCB of DDBB#21 so as to form the empty queue.

The DCCB of DDCB#22 or DDCB#24 is searched as a process preceding connection of the DCCB of DDCB#23 to the empty queue. The DDCB of DDCB#22 is present in the empty queue. The DDCB of the DDCB#23 is therefore connected directly after the DDCB of DDBB#22 so as to form the empty queue.

The DCCB of DDCB#8 or DDCB#10 is searched as a process preceding connection of the DCCB of DDCB#9 to the empty queue. The DDCB of DDCB#10 is present in the empty queue. The DDCB of the DDCB#9 is therefore connected directly before the DDCB of DDBB#10 so as to form the empty queue.

The DCCB of DDCB#7 or DDCB#9 is searched as a process preceding connection of the DCCB of DDCB#8 to the empty queue. The DDCB of DDCB#9 is present in the empty queue. The DDCB of the DDCB#8 is therefore connected directly before the DDCB of DDBB#9 so as to form the empty queue.

Figure 13C:
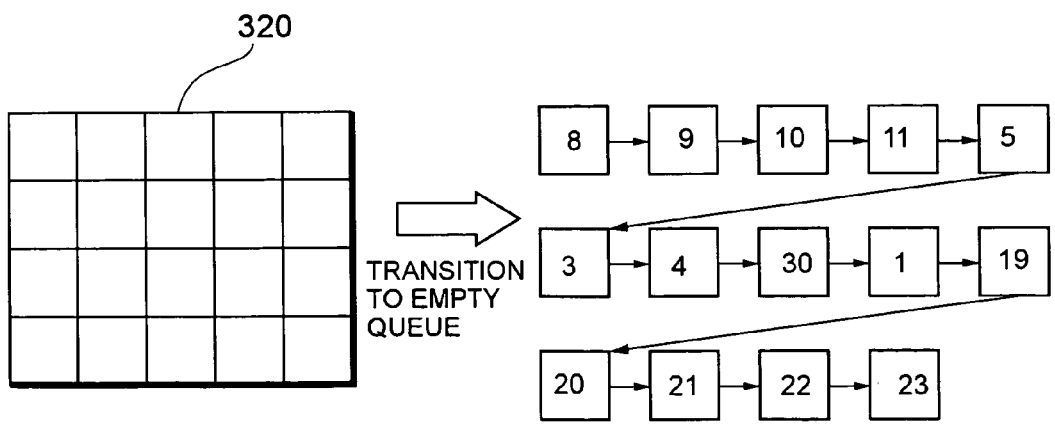

FIG. 13C shows the situation where DDCB queues for DDCB#20 and DDCB#19 make a transition to the empty queue.

The DCCB of DDCB#19 or DDCB#21 is searched as a process preceding connection of the DCCB of DDCB#20 to the empty queue. The DDCB of DDCB#21 is present in the empty queue. The DDCB of the DDCB#20 is therefore connected directly before the DDCB of DDBB#21 so as to form the empty queue.

The DCCB of DDCB#18 or DDCB#20 is searched as a process preceding connection of the DCCB of DDCB#19 to the empty queue. The DDCB of DDCB#20 is present in the empty queue. The DDCB of the DDCB#19 is therefore connected directly before the DDCB of DDBB#20 so as to form the empty queue.

As shown in FIG. 13C, the order of some of the DDCB's of the plurality of DDCB's constituting the empty queue are sequential. When the plurality of DDCB's are sequential, the seek time at the time of disc access to the pool VOL 620 becomes short, and high-speed access can be implemented.

The algorithm described above is not limited to the line-up of the DDCB's for the whole of the empty queue being sequential. It is then preferable to not apply the algorithm described above, but rather apply an algorithm so that the DDCB's become lined up sequentially for the whole of the empty queue.

In the above description, an example is shown for a DDCB queue for managing the pool VOL 620 but this may similarly be applied to DDCB queues for managing the pool VOL 720. In particular, data saved to the pool VOL 620 is data that is the data of the primary VOL 600 at the time of splitting updated, and is not limited to data that is not transferred to the secondary VOL 700, and the pool VOL 720 is used for reconfiguring the secondary VOL 700, and is not limited to data saved to the pool VOL 720. However, the order of the DDCB queue managing the pool VOL 720 is irregular because the order of writing data and the order of deleting data are different. Here, sequential access of the pool VOL 720 can be achieved if the method described above is applied as the queue management method for the DDCB queue for managing the pool VOL 720. In the event that the secondary storage control device 50 is managed as a RAID using RAID level 5 or RAID level 6, it is possible to dramatically reduce priority generation overhead, the effect of which is substantial.

Next, a description is given of the flow of the process for primary/secondary switching while referring to FIG. 14A-14E, 15A-15E, 16A-16F, and 17A-17D. The primary/secondary switching process is executed upon a fault occurring in the primary host system 100 or the primary storage control device 20. The primary/secondary switching process is executed as a result of a primary/secondary switching command being sent from the secondary host system 110 to the controller 30. The primary/secondary switching command can be configured using a single command but in this embodiment, an example is shown where the primary/secondary switching command is configured from two commands (an SVOL-takeover command and a Swap-takeover command). The SVOL-takeover command is a command for managing processing of data not yet transferred from the primary VOL 600 to the secondary VOL 700 as a process prior to switching from primary to secondary. The Swap-takeover command is a command for switching an old primary VOL to a new secondary VOL, or an old secondary VOL to a new primary VOL.

In FIG. 14A-14E, 15A-15E, 16A-16F, and 17A-17D, "TCA" refers to a pair between the primary VOL 600 and the secondary VOL 700. "TCB" refers to a pair between the virtual VOL 610 and the secondary VOL 700. "QS" refers to a pair between the primary VOL 600 and the virtual VOL 610, or a pair between the secondary VOL 700 and a virtual VOL 710.

First, a description is given with reference to FIG. 14A-14E and FIG. 15A-15E of the flow of a process for primary/secondary switching in a state where there is no write access to the primary VOL 600.

Figure 14A:
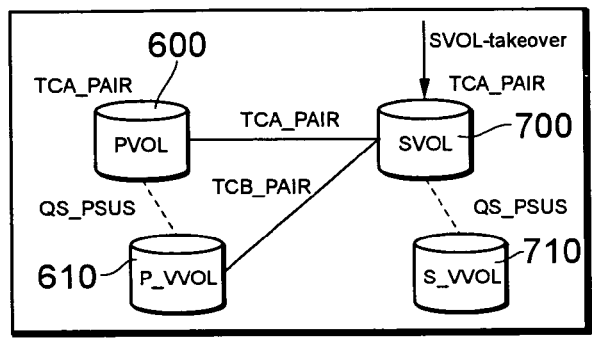
FIG. 14A-14E are views illustrating an SVOL-takeover process in the event that there is no write access to a primary volume VOL.

FIG. 14A shows the pair state for each volume at the time when the secondary storage control device 50 receives an SVOL-takeover command from the secondary host system 110. The pair state between the primary VOL 600 and the secondary VOL 700 is "PAIR", the pair state between the virtual VOL 610 and the secondary VOL 700 is "PAIR", the pair state between the primary VOL 600 and the virtual VOL 610 is "PSUS", and the pair state between the secondary VOL 700 and the virtual VOL 710 is "PSUS".

Figure 14B:
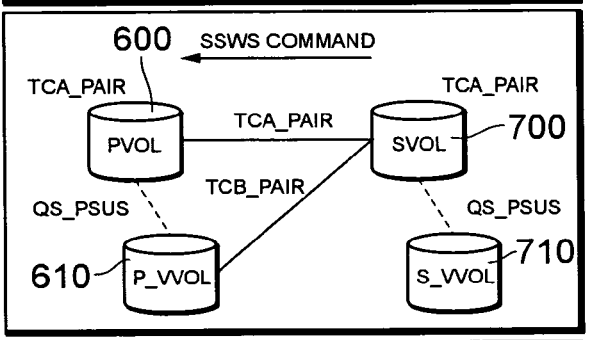

As shown in FIG. 14B, when an SVOL-takeover command is received, the secondary storage control device 50 sends an SSWS command to the primary storage control device 20. The SSWS command is a command that interrogates the primary storage control device 20 as to whether or not there is data that is not yet transferred from the primary VOL 600 to the secondary VOL 700, and in the event that not yet transferred data exists, requests transfer of this not-yet transferred data to the secondary storage control device 50. There is no change in the pair state between each volume.

Figure 14C:
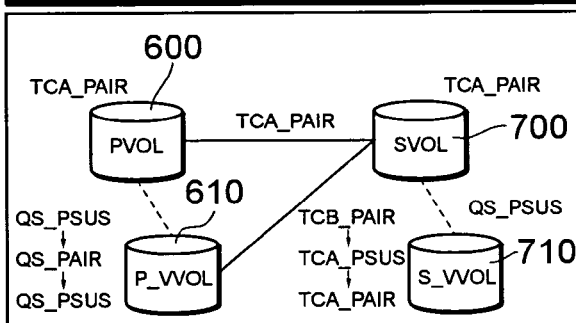

As shown in FIG. 14C, when an SSWS command is received from the secondary storage control device 50, the primary storage control device 20 updates the data within the virtual VOL 610 with data of the primary VOL 600 at this point in time (the time when the pair state of the primary VOL 600 and the virtual VOL 610 is changed to "PSUS") by changing the pair states between the primary VOL 600 and the virtual VOL 610 to "PSUS"→"PAIR"→"PSUS" and changing the pair states between the virtual VOL 610 and the secondary VOL 700 to "PAIR"→"PSUS"→"PAIR", and transfers differential data for before and after updating from the virtual VOL 610 to the secondary VOL 700.

Figure 14D:
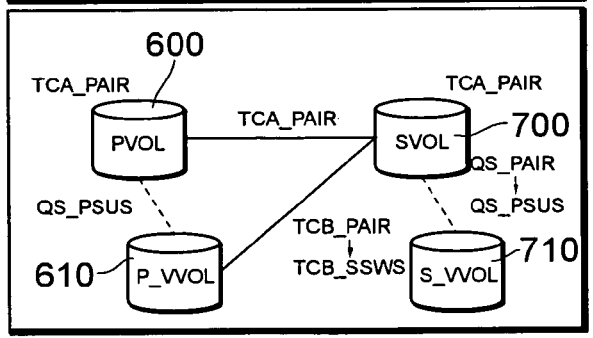

As shown in FIG. 14D, when transfer of differential data from the virtual VOL 610 to the secondary VOL 700 is complete, the storage system 10 changes the pair state between the virtual VOL 610 and the secondary VOL 700 from "PAIR" to "SSWS", and changes the volume state of the virtual VOL 710 to "SMPL". "SMPL" shows a state where there is no primary/secondary relationship for any volume.

Figure 14E:
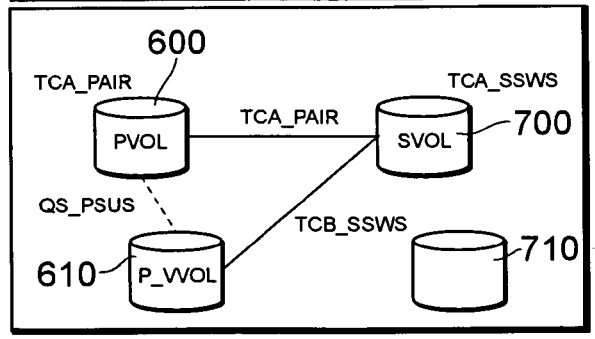

As shown in FIG. 14E, the storage system 10 changes the state of the secondary VOL 700 to "SSWS". "SSWS" shows a state where the secondary VOL 700 is capable of reading/writing. In this state, data of the secondary VOL 700 is reconfigured to content defined for the previous time.

Figure 15A:
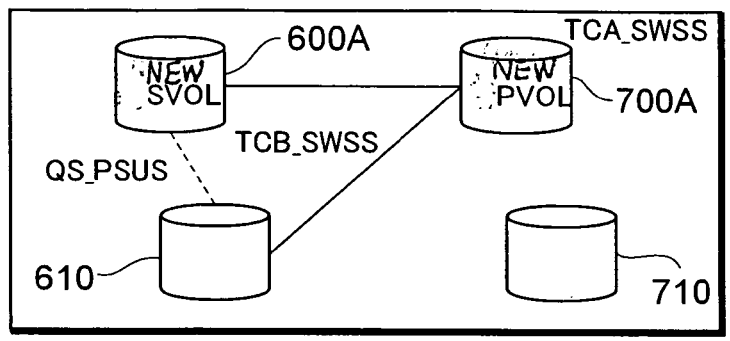
FIG. 15A-15E are views illustrating a Swap-Takeover process.

As shown in FIG. 15A, when the secondary storage control device 50 receives a Swap-takeover command from the secondary host system 110, the secondary storage control device 50 executes a process (primary/secondary switching process) to switch the old secondary VOL 700 to a new primary VOL 700A, and to switch the old primary VOL 600 to a new secondary VOL 600A. At this time, in the event that the primary storage control device 20 is reconfiguring data of the new primary VOL 600A using a snapshot within the virtual VOL 610, completion of this reconfigure is awaited, and a transition is made to the state of FIG. 15B.

Figure 15B:
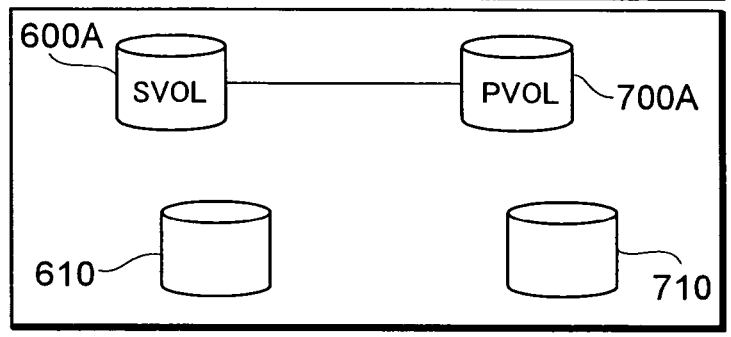

As shown in FIG. 15B, the pair state between the new secondary VOL 600A and the virtual VOL 610 is changed to "SMPL", and the pair state between the new primary VOL 700A and the virtual VOL 610 is changed to "SMPL".

Figure 15C:
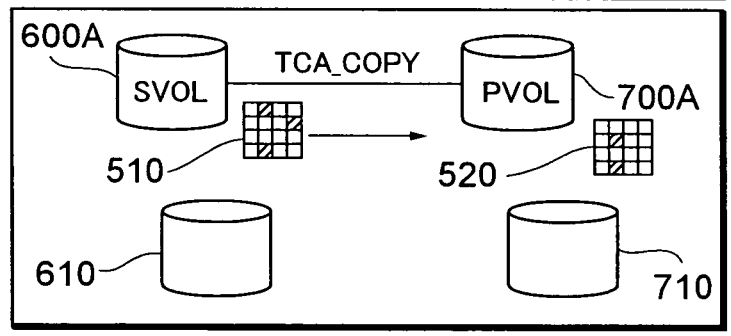

As shown in FIG. 15C, the transfer differential bitmap table 510 is transferred from the primary storage control device 20 to the secondary storage control device 50, and the transfer differential bitmap table 510 is merged with the transfer differential bitmap table 520.

Figure 15D:
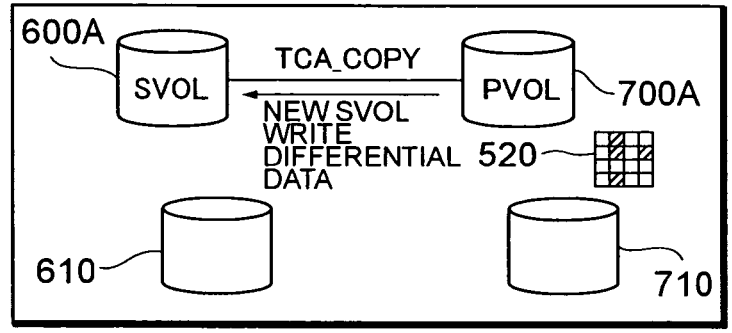

As shown in FIG. 15D, the secondary storage control device 50 executes a process (initial copy) writing differential data to the new secondary VOL 600A based on the transfer differential bitmap table 520.

Figure 15E:
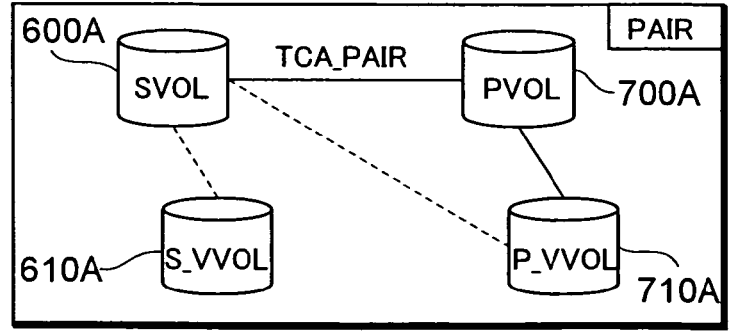

FIG. 15E shows the pair state for each volume after completion of the initial copy. The virtual VOL 610 using the old primary VOL 600 can then be switched to the virtual VOL 610A using the new secondary VOL 600A, and the virtual VOL 710 using the old secondary VOL 700 can be switched to the virtual VOL 710A using the new primary VOL 700A. The pair state between the new primary VOL 700A and the new secondary VOL 600A then becomes "PAIR", and the pair state between the new secondary VOL 600A and the virtual VOL 710A becomes "PAIR". The secondary storage control device 50 is capable of accepting write accesses from the secondary host system 110.

Next, a description is given with reference to FIG. 16A-16F of the flow of a process for primary/secondary switching in a state where there is a write access to the primary VOL 600.

Figure 16A:
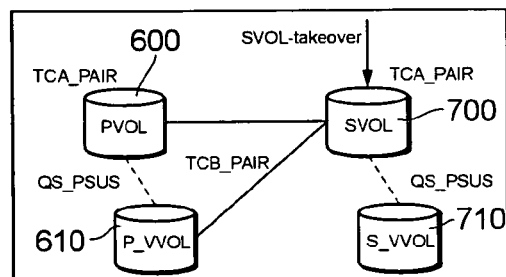
FIG. 16A-16F are views illustrating an SVOL-takeover process in the event that there is a write access to a primary volume VOL.

FIG. 16A shows the pair state for each volume at the time when the secondary storage control device 50 receives an SVOL-takeover command from the secondary host system 110. The pair state between the primary VOL 600 and the secondary VOL 700 is "PAIR", the pair state between the virtual VOL 610 and the secondary VOL 700 is "PAIR", the pair state between the primary VOL 600 and the virtual VOL 610 is "PSUS", and the pair state between the secondary VOL 700 and the virtual VOL 710 is "PSUS".

Figure 16B:
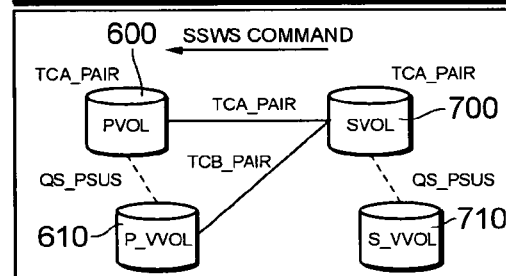

As shown in FIG. 16B, when an SVOL-takeover command is received, the secondary storage control device 50 sends an SSWS command to the primary storage control device 20. There is no change in the pair state between each volume.

Figure 16C:
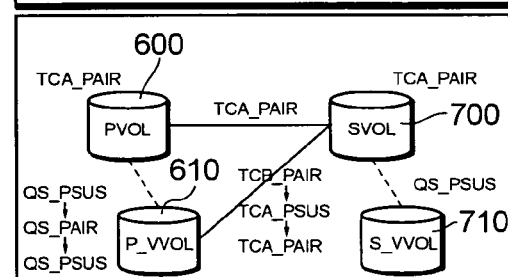

As shown in FIG. 16C, when an SSWS command is received from the secondary storage control device 50, the primary storage control device 20 updates the data within the virtual VOL 610 with data of the primary VOL 600 at this point in time (the time when the pair state of the primary VOL 600 and the virtual VOL 610 is changed to "PSUS") by changing the pair states between the primary VOL 600 and the virtual VOL 610 to "PSUS"→"PAIR"→"PSUS" and changing the pair states between the virtual VOL 610 and the secondary VOL 700 to "PAIR"→"PSUS"→"PAIR", and transfers differential data for before and after updating from the virtual VOL 610 to the secondary VOL 700.

Figure 16D:
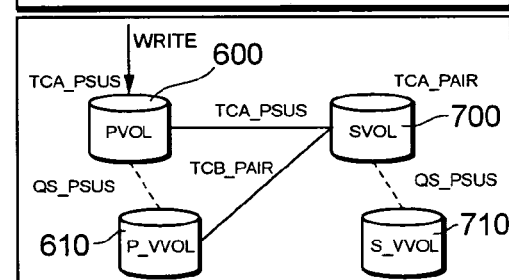

As shown in FIG. 16D, when there is a write access from the primary host system 100, the primary storage control device 20 puts the bit of the differential bitmap table 310 corresponding to the data update position of the PVOL 600 on. The pair state between the primary VOL 600 and the secondary VOL 700 is "PSUS". Regarding data updating of the primary VOL 600 by a write access from the primary host system 100, the primary storage control device 20 only tracks the data update position for the primary VOL 600 using the differential bitmap table 310 and a snapshot is not made.

Figure 16E:
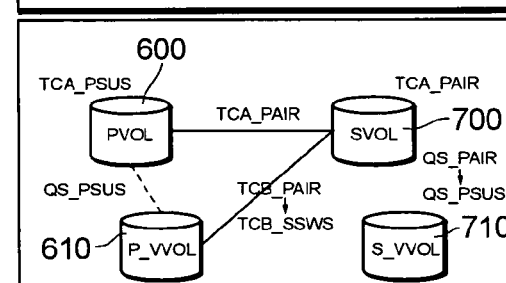

As shown in FIG. 16E, when transfer of differential data from the virtual VOL 610 to the secondary VOL 700 is complete, the storage system 10 changes the pair state between the virtual VOL 610 and the secondary VOL 700 from "PAIR" to "SSWS", and changes the volume state of the virtual VOL 710 to "SMPL".

Figure 16F:
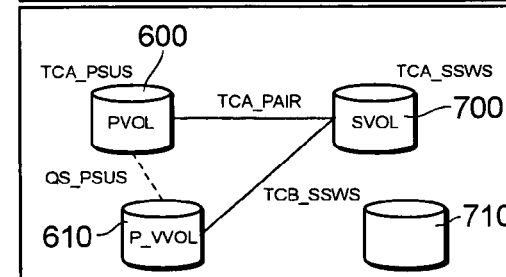

As shown in FIG. 16F, the storage system 10 changes the state of the secondary VOL 700 to "SSWS". "SSWS" shows a state where the secondary VOL 700 is capable of reading/writing. In this state, data of the secondary VOL 700 is reconfigured to content defined for the previous time.

After this, the primary/secondary switching process changes to the process shown in FIG. 15A-15E. The details of the process shown in FIG. 15A-15E are described above and are therefore not described here.

Next, a description is given of the flow of the process for primary/secondary switching in a situation where the state of the primary storage control device 20 is unclear, while referring to FIG. 17A-17D.

Figure 17A:
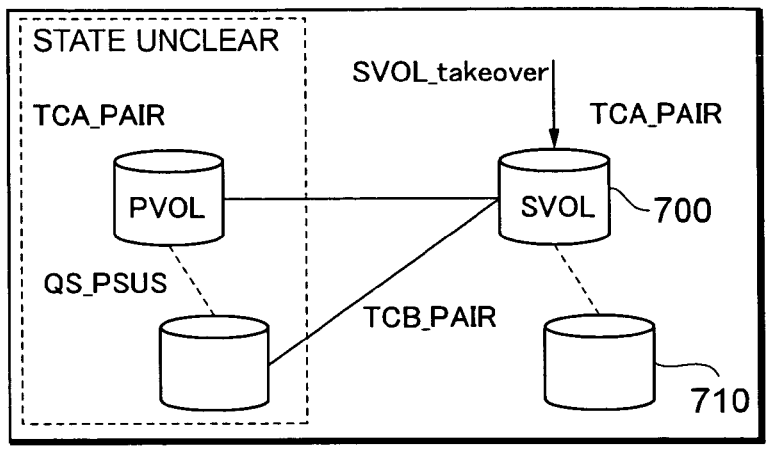
FIG. 17A-17D are views illustrating an SVOL-takeover process in the event that a fault occurs in a primary storage control device.

FIG. 17A shows the pair state for each volume at the time when the secondary storage control device 50 receives an SVOL-takeover command from the secondary host system 110.

Figure 17B:
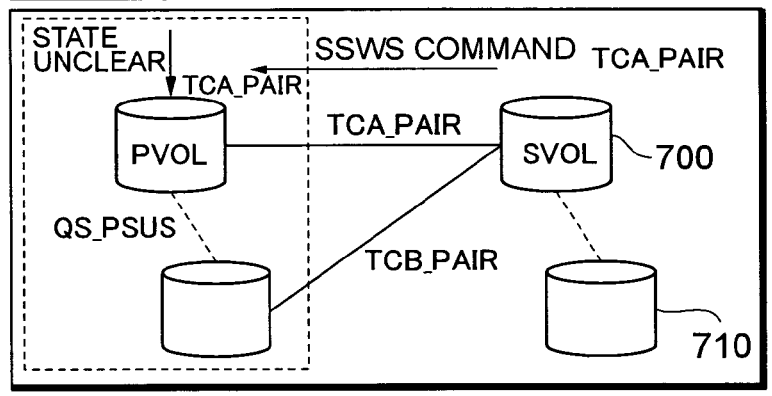

As shown in FIG. 17B, when an SVOL-takeover command is received, the secondary storage control device 50 sends an SSWS command to the primary storage control device 20. However, a fault etc. has occurred at the primary storage control device 20, and a timeout therefore occurs without a response to the SSWS command being sent back.

Figure 17C:
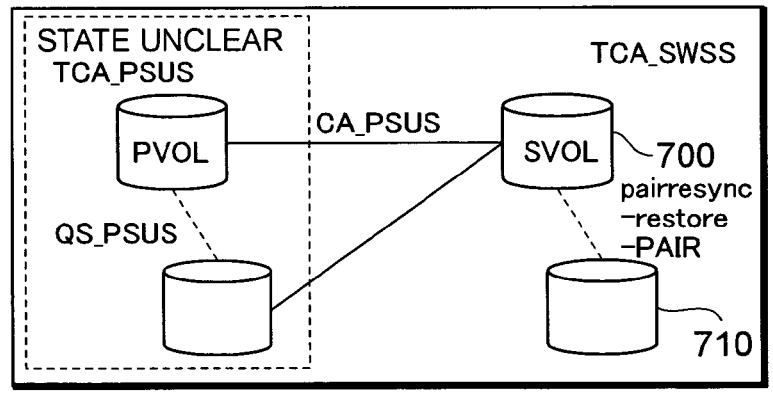

As shown in FIG. 17C, the secondary storage control device 50 then restores the data of the secondary VOL 700 using a snapshot logically held in the virtual VOL 710. The secondary VOL 700 is then capable of reconfiguring to a data image occurring at the time of acquisition of the newest snapshot. The secondary storage control device 50 then changes the state of the secondary VOL 700 to "SSWS".

Figure 17D:
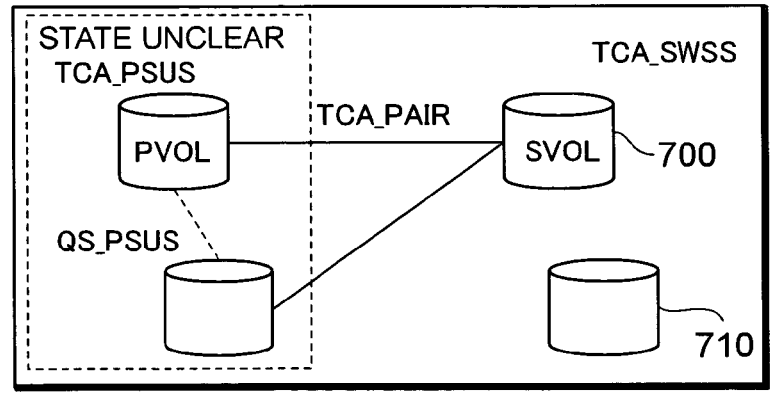

As shown in FIG. 17D, the secondary storage control device 50 changes the state of the virtual VOL 710 to "SMPL".

It is therefore possible for the secondary host system 110 and the secondary storage control device 50 to operate as an operation system by executing the primary/secondary switching process described above in the event of a fault at the primary host system 100 and the primary storage control device 20.

What is claimed is:

1. A storage system comprising a primary storage control device having a first logical volume and a secondary storage control device having a second logical volume capable of forming a copy pair with the first logical volume,
said primary storage control device further comprising:
a first differential bitmap table for managing positions of updates to the first logical volume due to host accesses;
first snapshot management information for logically reconfiguring a data image of the first logical volume;
a first pool region for storing data prior to updating said data image of the first logical volume as a result of a host access;
a first writing section for writing the data prior to updating to the first pool region when the first logical volume is updated at a predetermined timing onwards;
a first snapshot updating section for updating the first snapshot management information with information for logically reconfiguring said data image of the first logical volume occurring at the time of the predetermined timing when the first logical volume is updated at the predetermined timing onwards;
a first transfer differential bitmap table for managing whether or not update data of the first logical volume has been remote copied to the second logical volume;
a transfer bitmap table update section for updating the first transfer differential bitmap table by merging bit information of the first differential bitmap table with the first transfer differential bitmap table; and
a remote copy section for discerning whether each data constituting said data image of the first logical volume at the point in time of the predetermined timing is in the first logical volume or the first pool region based on the updated first transfer differential bitmap table, and acquiring data from the discerned party and transmitting the data to the second logical volume, and said secondary storage control device further comprising:

a second transfer differential bitmap table for managing positions of updates to the second logical volume due to remote copying;

second snapshot management information for logically reconfiguring a data image of the second logical volume;

a second pool region for storing data prior to updating said data image of the second logical volume as a result of remote copying;

a second writing section for writing the data prior to updating to the first pool region when the second logical volume is updated as a result of remote copying; and a second snapshot updating section for updating the second snapshot management information with information for logically reconfiguring said data image of the second logical volume occurring at the timing of the predetermined time when the second logical volume is updated.

2. The storage system according to claim 1, wherein the secondary storage control device further comprises:

an interrogating section for interrogating the primary storage control device as to whether or not yet to be transferred data that has not been remote copied from the primary storage control device to the secondary storage control device is present when a primary/secondary switching command is received from a host system; and an updating section for, in the event that yet to be transferred data exists, receiving the yet to be transferred data from the primary storage control device and updating the second logical volume.

3. The storage system according to claim 2, wherein the primary storage control device further comprises:

a management section for managing update positions of the first logical volume due to host accesses to the first logical volume occurring at the time of the secondary storage control device receiving the primary/secondary switching command onwards using the first differential bitmap table.

4. The storage system according to claim 2, wherein the secondary storage control device further comprises:

a restoring section for restoring a data image for the second logical volume occurring at a point in time in the past based on the second snapshot management information in the event that there is no response from the primary storage control device to the interrogation.

5. The storage system according to claim 1, wherein the first writing section, for bits of the first differential bitmap table indicating the presence of a data update, writes the data prior to updating of the first logical volume corresponding to bits not yet merged with the first transfer differential bitmap table to the first pool region.

6. The storage system according to claim 1, wherein the first logical volume is one of a plurality of logical volumes, in the primary storage control device and the first pool region is one of a plurality of pool regions in the primary storage control device, wherein each of the plurality of logical volumes correlates to at least one of the plurality of pool regions, and wherein the first writing section writes data prior to updating of the first logical volume to the first pool region correlating to the first logical volume.

7. The storage system according to claim 1, wherein the second logical volume is one of a plurality of logical volumes in the secondary storage control device and the second pool region is one of a plurality of pool regions in the secondary storage control device, wherein each of the plurality of logical volumes correlates to at least one of the plurality of pool regions, and wherein the second writing section writes data prior to updating of the second logical volume to the second pool region correlating to the second logical volume.

8. The storage system according to claim 1, wherein the first snapshot management information contains a plurality of differential data control blocks correlated to each block of the first pool region, wherein the primary storage control device further comprises an empty queue management section for connecting differential data control blocks that managed the deleted data prior to updating to an empty queue when the data prior to updating written to the first pool region is deleted, and wherein the empty queue management section checks whether or not a differential data control block having a number of ±1 of a number of a differential data control block constituting the target of connection is connected to the empty queue while connecting the differential control block that is the target of connection to the empty queue, and connects the differential data control block constituting the target of connection to immediately before the differential data control block having a number of +1 the number of the differential data control block constituting the target of connection in the event that the differential data control block having the number of +1 the number of the differential data control block constituting the target of connection is connected to the empty queue, connects the differential data control block constituting the target of connection to immediately after the differential data control block having a number of −1 the number of the differential data control block constituting the target of connection in the event that the differential data control block having a number of −1 the number of the differential data control block constituting the target of connection is connected to the empty queue, and connects the differential data control block constituting the target of connection to the tail end of the empty queue in the event that the differential data control block having a number of ±1 the number of the differential data control block constituting the target of connection is not connected to the empty queue.

9. The storage system according to claim 1, wherein the second snapshot management information contains a plurality of differential data control blocks correlated to each block of the second pool region, wherein the secondary storage control device further comprises an empty queue management section for connecting differential data control blcoks that managed the deleted data prior to updating to an empty queue when the data prior to updating written to the second pool region is deleted, and wherein the empty queue management section checks whether or not a differential data control block having a number of ±1 of a number of a differential data control block constituting the target of connection is connected to the empty queue while connecting the differential control block that is the target of connection to the empty queue, and connects the differential data control block constituting the target of connection to immediately before the differential data control block having a number of +1 the number of the differential data control block constituting the target of connection in the event that the differential data control block having the number of +1 the number of the differential data control block constituting the target of connection is connected to the empty queue, connects the differential data control block constituting the target of connection to immediately after the differential data control block having a number of −1 the number of the differential data control block constituting the target of connection in the event that the differential data control block having a number of −1 the number of the differential data control block constituting the target of connection is connected to the empty queue, and connects the differential data control block constituting the target of connection to the tail end of the empty queue in the event that the differential data control block having a number of ±1 the number of the differential data control block constituting the target of connection is not connected to the empty queue.

10. A storage system control method comprising the steps of:

accepting host accesses to a primary storage control device having a first logical volume;

managing positions of updates to the first logical volume due to host accesses using a first differential bitmap table;

writing data to a first pool region prior to updating a data image of the first logical volume at a predetermined timing onwards as a result of a host access;

updating first snapshot management information with information for logically reconfiguring said data image of the first logical volume at the time of the predetermined timing when the first logical volume is updated at the predetermined timing onwards;

merging bit information of the first differential bitmap table with a first transfer differential bitmap table for managing whether or not update data for the first logical volume possessed by the primary storage control device is remote copied to a second logical volume possessed by the secondary storage control device;

discerning whether each data constituting said data image of the first logical volume at the point in time of the predetermined timing is in the first logical volume or the first pool region based on the updated first transfer differential bitmap table, and acquiring data from a discerned party and remote copying the data to the second logical volume;

managing positions of updates to the second logical volume due to remote copying using a second transfer differential bitmap table;

writing differential data to a second pool region prior to updating a data image of the second logical volume as a result of remote copying;

updating second snapshot management information with information for logically reconfiguring said data image of the second logical volume at the time of the predetermined timing when the second logical volume is updated.

11. The storage system control method according to claim 10, further comprising the steps of:

receiving a primary/secondary switching command from a host system;

interrogating the primary storage control device as to whether or not yet to be transferred data that has not been remote copied from the primary storage control device to the secondary storage control device is present; and in the event that yet to be transferred data exists, receiving the yet to be transferred data from the primary storage control device and updating the second logical volume.

12. The storage system control method according to claim 11, further comprising a step of: managing update positions of the first logical volume due to host accesses to the first logical volume occurring at the time of receiving the primary/secondary switching command onwards using the first differential bitmap table.

13. The storage system control method according to claim 11, further comprising a step of: restoring a data image for the second logical volume occurring at a point in time in the past based on the second snapshot management information in the event that there is no response from the primary storage device to the interrogation.

14. The storage system control method according to claim 10, further comprising a step of: for bits, of the first differential bitmap table, indicating the presence of a data update, writing the data prior to updating of the first logical volume corresponding to bits not yet merged with the first transfer differential bitmap table to the first pool region.

15. The storage system control method according to claim 10, wherein the first logical volume is one of a plurality of logical volumes in the primary storage control device and the first pool region is one of a plurality of pool regions in the primary storage control device, wherein each of the plurality of logical volumes correlates to at least one of the plurality of pool regions in the primary storage control device, and wherein the control method further comprises a step of writing data prior to updating of the first logical volume to the first pool region correlating to the first logical volume.

16. The storage system control method according to claim 10, wherein the second logical volume is one of a plurality of logical volumes in the secondary storage control device, and the second pool region is one of a plurality of pool regions in the secondary storage control device, wherein each of the plurality of logical volumes correlates to at least one of the plurality of pool regions in the secondary storage control device, and wherein the control method further comprises a step of writing data prior to updating of the second logical volume to the second pool region correlating to the second logical volume.

17. The storage system control method according to claim 10, wherein the first snapshot management information contains a plurality of differential data control blocks correlated to each block of the first pool region, wherein the primary storage control device further comprises an empty queue management section for connecting differential data control blocks that managed the deleted data prior to updating to an empty queue when the data prior to updating written to the first pool region is deleted, and wherein the control method further comprises the steps of:

checking whether or not a differential data control block having a number of ±1 of a number of a differential data control block constituting the target of connection is connected to the empty queue while connecting the differential control block constituting the target of connection to the empty queue;

connecting the differential data control block constituting the target of connection to immediately before the differential data control block having a number of +1 the number of the differential data control block constituting the target of connection in the event that the differential data control block having the number of +1 the number of the differential data control block constituting the target of connection is connected to the empty queue;

connecting the differential data control block constituting the target of connection to immediately after the differential data control block having a number of −1 the number of the differential data control block constituting the target of connection in the event that the differential data control block having a number of −1 the number of the differential data control block constituting the target of connection is connected to the empty queue; and connecting the differential data control block constituting the target of connection to the tail end of the empty queue in the event that the differential data control block having a number of ±1 the number of the differential data control block constituting the target of connection is not connected to the empty queue.

18. The storage system control method according to claim 10, wherein the second snapshot management information contains a plurality of differential data control blocks correlated to each block of the second pool region, wherein the secondary storage control device further comprises an empty queue management section for connecting differential data control blocks that managed the deleted data prior to updating to an empty queue when the data prior to updating written to the second pool region is deleted, and wherein the control method further comprises the steps of:

checking whether or not a differential data control block having a number of ±1 of a number of a differential data control block constituting the target of connection is connected to the empty queue while connecting the differential control block constituting the target of connection to the empty queue;

connecting the differential data control block constituting the target of connection to immediately before the differential data conrol block having a number of +1 the number of the differential data control block constituting the target of connection in the event that the differential data control block having the number of +1 the number of the differential data control block constituting the target of connection is connected to the empty queue;

connecting the differential data control block constituting the target of connection to immediately after the differential data control block having a number of −1 the number of the differential data control block constituting the target of connection in the event that the differential data control block having a number of −1 the number of the differential data control block constituting the target of connection is connected to the empty queue; and connecting the differential data control block constituting the target of connection to the tail end of the empty queue in the event that the differential data control block having a number of ±1 the number of the differential data control block constituting the target of connection is not connected to the empty queue.

* * * * *